US011498857B2

(12) United States Patent
Derese et al.

(10) Patent No.: US 11,498,857 B2
(45) Date of Patent: Nov. 15, 2022

(54) METHOD FOR RECOVERING N FROM A LIQUID WASTE STREAM

(71) Applicant: Universiteit Gent, Ghent (BE)

(72) Inventors: Sebastiaan Derese, Gentbrugge (BE); Arne Verliefde, Meigem (BE)

(73) Assignee: Universiteit Gent, Ghent (BE)

( * ) Notice: Subject to any disclaimer, the term of this patent is extended or adjusted under 35 U.S.C. 154(b) by 311 days.

(21) Appl. No.: 16/761,853

(22) PCT Filed: Nov. 27, 2018

(86) PCT No.: PCT/EP2018/082700
§ 371 (c)(1),
(2) Date: May 6, 2020

(87) PCT Pub. No.: WO2019/102035
PCT Pub. Date: May 31, 2019

(65) Prior Publication Data
US 2021/0198125 A1 Jul. 1, 2021

(30) Foreign Application Priority Data
Nov. 27, 2017 (EP) .................................... 17203835

(51) Int. Cl.
C02F 1/469 (2006.01)
C02F 1/00 (2006.01)
C02F 1/66 (2006.01)
C02F 1/52 (2006.01)
C02F 101/10 (2006.01)
(Continued)

(52) U.S. Cl.
CPC ............ *C02F 1/4693* (2013.01); *C02F 1/001* (2013.01); *C02F 1/66* (2013.01); *C02F 2001/5218* (2013.01); *C02F 2101/105* (2013.01); *C02F 2101/12* (2013.01); *C02F 2101/16* (2013.01)

(58) Field of Classification Search
USPC .......................................... 210/653; 205/746
See application file for complete search history.

(56) References Cited

U.S. PATENT DOCUMENTS 10,125,428 B2 * 11/2018 Barak ................... C02F 1/4693
10,676,374 B1 * 6/2020 Lunn ....................... C02F 1/281
2001/0040093 A1 11/2001 Mani
(Continued)

FOREIGN PATENT DOCUMENTS

CN 106380029 * 2/2017 ................ C02F 9/06
CN 106380029 A 2/2017
(Continued)

OTHER PUBLICATIONS

International Search Report dated Feb. 14, 2019 from International Patent Appln. No. PCT/EP2018/082700.
(Continued)

*Primary Examiner* — Nina Bhat
(74) *Attorney, Agent, or Firm* — Amster, Rothstein & Ebenstein LLP

(57) ABSTRACT

A method and a system for recovering nitrogen, and optionally phosphorus and/or potassium, from a liquid waste stream, such as a stream of urine or manure, or human urine is described. The method comprises passing the waste stream through a multi-compartment electrodialysis bipolar membrane (EDBM) system.

19 Claims, 13 Drawing Sheets

(51) Int. Cl.
*C02F 101/12* (2006.01)
*C02F 101/16* (2006.01)

(56) References Cited

U.S. PATENT DOCUMENTS

| 2008/0053909 | A1* | 3/2008 | Fassbender | B01J 39/04 |
| | | | | 210/903 |
| 2014/0045248 | A1* | 2/2014 | Wallace | B01D 9/0054 |
| | | | | 422/187 |

FOREIGN PATENT DOCUMENTS

| CN | 113184818 | * | 7/2021 | ........... | C01B 25/234 |
| JP | H09-271781 | * | 10/1997 | ........... | B01D 61/246 |

OTHER PUBLICATIONS

Written Opinion dated Feb. 14, 2019 from International Patent Appln. No. PCT/EP2018/082700.

* cited by examiner

METHOD FOR RECOVERING N FROM A LIQUID WASTE STREAM

CROSS-REFERENCE TO RELATED APPLICATIONS

This application is a U.S. national stage entry under 35 U.S.C. § 371 of PCT International Patent Application No. PCT/EP2018/082700, filed Nov. 27, 2018, which claims priority to European Patent Application No. 17203835.8, filed Nov. 27, 2017, the contents of each of which are incorporated herein by reference in their entirety.

FIELD OF THE INVENTION

The present invention relates to a method for recovering N from a liquid waste stream; such as a stream of urine, such as human urine, or manure, said method comprising passing said waste stream through a multi-compartment electrodialysis bipolar membrane (EDBM) system.

BACKGROUND OF THE INVENTION

Nitrogen (N) is an essential element for all living organisms, plants and animals alike. Human urine in particular is a key source containing a significant amount of inorganic and organic compounds, for example those containing N (e.g. urea, Uric acid, ammonium). With the introduction of general sanitation, however, human waste is indirectly disposed of into water bodies and the increased dilution renders the valuable fertilizing components of sewage practically worthless.

Several nutrient removal and recovery technologies are known to extract resources from wastewater or from urine in particular. However, these are often chemically, energetically and/or operationally intensive, the extraction process itself has adverse environmental effects, and/or the product in which the nutrients are recovered is polluted with substances harmful to human health.

The streams often also contain undesirable products that are ideally removed, such as $Na^+$, $Cl^-$ or organic pollution. Treatment processes aimed at recovery of nutrients from waste streams have to prevent such inorganics ending up in their value-added recovery products, as the presence of unwanted salinity reduces product value. Usually, the technical challenge entails selective separation of target ions with an added value (e.g. $NH_4^+$, $PO_4^{3-}$, $K^+$, etc.) from the bulk (organic substances, background salinity).

In addition, many recovery/extraction processes require pH adjustment to ensure good performance (e.g. struvite precipitation requires pH 8-9; ammonia stripping requires pH 9-10; acidification to release phosphate requires a pH<2). In classic processes, pH adjustment is done by dosing concentrated caustic and acidic solutions, posing a threat to bystanders, workers and the environment, while the reduced product value caused by the addition of unwanted ions (e.g. Na+ when dosing NaOH) is dismissed as 'part of the process'. Modifications to alter the process require a complete re-design of the existing installation. Finally, cleaning of this type of installation is usually done by rinsing a HOCl solution, which has to be transported in, and entails costs and hazards.

Chemical dosage techniques in the art, often based on $H_2SO_4$/NaOH, are typically accompanied by significant safety hazards and can be fairly expensive. Electrochemical systems in the art provide a safer alternative, but typically have high CAPEX and corrosion of the electrode. Dosage of concentrated acids and bases also produces heat, and requires storage and transport units that can handle the corrosive characteristics. Typically, existing electrochemical dosage systems require large amounts of expensive electrode surfaces. CN 106 380 029 describes an electrodialysis bipolar membrane system which may be used for wastewater deamination.

Hence, it is an aim of the present invention to overcome one or more of the problems of the art. In particular, there is a need for an improved method that can recover N without the aforementioned drawbacks.

SUMMARY OF THE INVENTION

The presently described method(s) and system (s) address one or more problems of the art described above.

According to a first aspect, the present invention relates to a method for the recovery of N from a liquid waste stream comprising an N-comprising compound, preferably a liquid waste stream comprising urine, excreta and/or wastewater, said method comprising passing said waste stream through a multi-compartment electrodialysis bipolar membrane (EDBM) system. The EDBM system typically comprises an anode electrode, a cathode electrode, a bipolar membrane, at least one (preferably monovalent) cation exchange membrane, at least one (preferably monovalent) anion exchange membrane. The system preferably comprises at least four flow channels comprising a first flow channel provided at the anode side of the EDBM system and bound by a monovalent cation exchange membrane, a second flow channel bound by the monovalent cation exchange membrane and the OH− producing side of a bipolar membrane, and having an inlet for providing the liquid waste stream to the second flow channel, a third flow channel, bound by the H+ producing side of a bipolar membrane and a monovalent anion exchange membrane, and a fourth flow channel, provided at the cathode side of the EDBM system and bound by the monovalent anion exchange membrane. The method preferably comprises the steps of:

(a) increasing the pH of the liquid waste stream and transfer of monovalent cations by contacting said liquid waste stream simultaneously with the OH− producing side of the bipolar membrane and with a monovalent cation exchange membrane of the multi-compartment EDBM system, thus obtaining a pH adjusted liquid waste stream;

(b) removing the N-comprising compound from the pH adjusted liquid waste stream, thereby obtaining a N-poor waste stream;

(c) optionally, concentrating the N-poor waste stream through water removal, preferably by a membrane distillation system, thereby obtaining a concentrated N-poor waste stream;

(d) separating at least part of the, optionally concentrated, N-poor waste stream into a first part and a second part; and, (e) returning or recycling at least part of the, optionally concentrated, N-poor waste stream to the multi-compartment EDBM system, while:

(i) removing the monovalent ions transferred in step (a) from the first part of the, optionally concentrated, N-poor waste stream, preferably by contacting said, optionally concentrated, N-poor waste stream with a monovalent ion extraction means, preferably a monovalent cation exchange membrane; and, (ii) removing monovalent anions, preferably Cl−, from the second part of the, optionally concentrated, N-poor waste stream by contacting said, optionally concentrated, N-poor waste stream with a monovalent anion exchange membrane.

In some preferred embodiments, the method further comprises the step of recovering P and K from said, optionally concentrated, N-poor waste stream through crystallization, preferably by addition of Mg ions, thus obtaining an, optionally concentrated, N—P—K-poor waste stream.

In some preferred embodiments, the step of recovering P and K is performed after step (c) by addition of $MgCl_2$ and subsequent recovery of K-struvite crystals, and wherein in step (e) at least part of the, optionally concentrated, N—P—K-poor waste stream is returned to the multi-compartment EDBM system.

In some preferred embodiments, in step (b) the pH adjusted liquid waste stream is contacted with an acidified receiving solution via a membrane for transferring the N-comprising compound to the acidified receiving solution, preferably in a membrane contactor unit.

In some preferred embodiments, the acidified receiving solution comprises a water stream, which is recirculated at the $H^+$ producing side of the bipolar membrane and which simultaneously captures the monovalent anions, preferably $Cl^-$, removed in step (e) from the, optionally concentrated, N-poor waste stream.

In some preferred embodiments, the water stream comprises water recovered from the pH adjusted liquid waste stream in step (c).

In some preferred embodiments, the N-comprising compound removed in step (b) is ammonia, which is recovered in the acidified receiving solution as $NH_4Cl$.

In some preferred embodiments, the method further comprises the step of rinsing the electrodes with a rinsing solution, preferably wherein the rinsing solution comprises NaCl, which is recirculated between the anode and the cathode, and preferably generating NaOCl in said rinsing solution.

In some preferred embodiments, the liquid waste stream, preferably the liquid waste stream comprising urine, is filtered prior to step (a), preferably to remove particulate matter.

In some preferred embodiments, the multi-compartment EDBM system comprises a cathode electrode, an anode electrode, a first flow channel, provided at the anode side of the EDBM system and bound by a monovalent cation exchange membrane, a second flow channel, bound by the monovalent cation exchange membrane and the $OH^-$ producing side of a bipolar membrane, a third flow channel, bound by the $H^+$ producing side of a bipolar membrane and a monovalent anion exchange membrane, and a fourth flow channel, provided at the cathode side of the EDBM system and bound by the monovalent anion exchange membrane. Preferably, the EDBM system comprises two rinse channels, each bound by an electrode and an anion exchange membrane and provided adjacent to the first and fourth flow channel, wherein the first channel is bound by an anion exchange membrane and the monovalent cation exchange membrane, and wherein the fourth channel is bound by an anion exchange membrane and the monovalent anion exchange membrane.

According to a second aspect, the present invention relates to a system suitable for use in the method according to the first aspect, or embodiments thereof. Therefore, the present invention also relates to a system for the recovery of N, and optionally P and/or K, from a liquid waste stream, preferably a liquid waste stream comprising urine, excreta and/or wastewater. The system preferably comprises:

a multi-compartment electrodialysis bipolar membrane (EDBM) system, comprising an anode and cathode electrode, a first flow channel, provided at the anode side of the EDBM system and bound by a monovalent cation exchange membrane, a second flow channel, bound by the monovalent cation exchange membrane and the OH− producing side of a bipolar membrane, having an inlet for providing the liquid waste stream, preferably the liquid waste stream comprising urine, to the second flow channel; a third flow channel, bound by the $H^+$ producing side of a bipolar membrane and a monovalent anion exchange membrane, and a fourth flow channel, provided at the cathode side of the EDBM system and bound by the monovalent anion exchange membrane, and preferably, two rinse channels, each bound by an electrode and an anion exchange membrane and provided adjacent to the first and fourth flow channel wherein the first channel is bound by an anion exchange membrane and the monovalent cation exchange membrane, and wherein the fourth channel is bound by an anion exchange membrane and the monovalent anion exchange membrane;

a unit for the recovery of N, wherein an inlet of said unit is connected to an outlet of the second flow channel and to an outlet of the third flow channel; and, optionally, a concentrator, wherein an inlet of said concentrator is connected to an outlet of the unit for the recovery of N, configured for concentrating the waste stream after passing through the second flow channel and the unit for the recovery of N by removal of water, thus allowing to obtain a concentrated N-poor waste stream, and wherein an outlet of said concentrator is connected to an inlet of the first and the fourth flow channel, configured to return at least part of the concentrated N-poor waste stream to the multi-compartment EDBM system.

In some preferred embodiments, the unit for the recovery of N is a membrane contactor unit having a first and a second compartment, wherein an inlet of the first compartment is connected with the outlet of the second flow channel and wherein an outlet of the first compartment is connected to the concentrator, wherein an inlet of the second compartment is connected with an outlet of the third channel of the EDBM system.

In some preferred embodiments, the concentrator is a membrane distillation system configured for concentration of the waste stream after passing through the second flow channel and the unit for the recovery of N, and wherein the system is configured for recycling the water removed from the waste stream in the concentrator to the third flow channel.

In some preferred embodiments, the system further comprises a crystallizer unit configured to recover P and K through crystallization from a concentrated waste stream, wherein the inlet of the crystallizer unit is connected to the outlet of the concentrator and the outlet of the crystallizer unit is connected to the first and fourth flow channel.

According to a third aspect, the present invention relates to the use of the system according to the second aspect, or embodiments thereof, for the recovery of N, and optionally P and/or K, from a liquid waste stream, preferably a liquid waste stream comprising urine, excreta and/or wastewater.

The inventors have surprisingly found that such methods and systems adjust the pH by generating $H^+$ and $OH^-$ ions in situ, without introducing new unwanted substances. Furthermore, the pH can be changed by changing process parameters instead of by making infrastructural changes. No separate tanks of NaOH and/or HCl are needed, thereby improving safety and removing the addition of unwanted Na$^+$ and Cl$^-$ ions into the stream.

Splitting and recycling the N-poor waste stream removes the necessity of an additional stream to transport the excess of ions. Such an additional stream would be undesirable and entails extra costs.

The methods and systems have little to no hazards, show limited fouling, and are CAPEX-friendly.

The system allows recovery of NH$_4^+$/K$^+$ from the N-poor waste stream, which allows further removal of N.

The methods and systems remove unwanted monovalent salts present in the original feed solution. In situ generation of HOCl for system cleaning is also possible without further chemical addition, or can be performed easily from a safe-to-handle NaCl solution. Since the electrode rinse solution can be used as a cleaning agent, there is no need for external HOCl solutions.

The inexpensive bipolar membrane bypasses expensive electrode surfaces. In addition, the membranes can be selective and changed when/if necessary.

The applied power allows for faster kinetics. Providing more cell pairs allows for a stronger effect, while not being limited to the electrode surface.

Furthermore, the systems can be modular, thereby targeting different waste streams and/or different end products. The installation of the system typically does not require any further infrastructural changes.

DETAILED DESCRIPTION OF THE INVENTION

Figure 1:
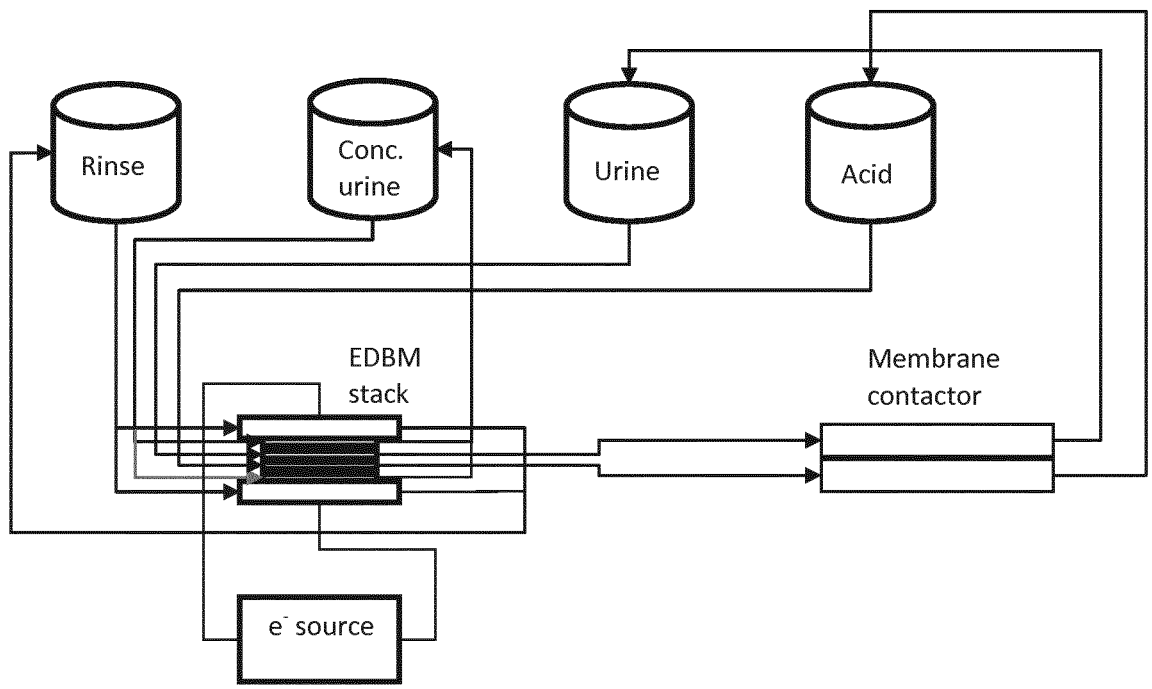
FIG. 1 illustrates a system according to an embodiment of the invention, which was used for the EDBM experiments in the example section.

Before the present methods and systems of the invention are described, it is to be understood that this invention is not limited to particular units and methods or combinations described, since such units and methods and combinations may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

The recitation of numerical ranges by endpoints includes all numbers and fractions subsumed within the respective ranges, as well as the recited endpoints.

Whereas the terms "one or more" or "at least one", such as one or more or at least one member(s) of a group of members, is clear per se, by means of further exemplification, the term encompasses inter alia a reference to any one of said members, or to any two or more of said members, such as, e.g., any ≥3, ≥4, ≥5, ≥6 or ≥7 etc. of said members, and up to all said members.

All references cited in the present specification are hereby incorporated by reference in their entirety. In particular, the teachings of all references herein specifically referred to are incorporated by reference.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the appended claims, any of the claimed embodiments can be used in any combination.

In the present description of the invention, reference is made to the accompanying drawings that form a part hereof, and in which are shown by way of illustration only of specific embodiments in which the invention may be practiced. Parenthesized and/or emboldened reference numerals affixed to respective elements merely exemplify the elements by way of example, with which it is not intended to limit the respective elements. It is to be understood that other embodiments may be utilised and structural or logical changes may be made without departing from the scope of the present invention. The following detailed description, therefore, is not to be taken in a limiting sense, and the scope of the present invention is defined by the appended claims.

The presently described method(s) and system (s) address one or more problems of the art described above.

According to a first aspect, the present invention relates to a method for the recovery of N from a liquid waste stream comprising an N-comprising compound, preferably a liquid waste stream comprising urine, excreta and/or wastewater, said method comprising passing said waste stream through a multi-compartment electrodialysis bipolar membrane (EDBM) system. The EDBM system comprises an anode electrode, a cathode electrode, a bipolar membrane, at least one, preferably monovalent, cation exchange membrane, at least one, preferably monovalent, anion exchange membrane. Preferably, the EDBM system comprises at least four flow channels comprising a first flow channel provided at the anode side of the EDBM system and bound by a monovalent cation exchange membrane, a second flow channel bound by the monovalent cation exchange membrane and the OH– producing side of a bipolar membrane, and having an inlet for providing the liquid waste stream to the second flow channel, a third flow channel, bound by the H+ producing side of a bipolar membrane and a monovalent anion exchange membrane, and a fourth flow channel, provided at the cathode side of the EDBM system and bound by the monovalent anion exchange membrane. The method comprises the steps of:
(a) increasing the pH of the liquid waste stream and transfer of monovalent cations by contacting said liquid waste stream simultaneously with the OH– producing side of the bipolar membrane and with a monovalent cation exchange membrane of the multi-compartment EDBM system, thus obtaining a pH adjusted liquid waste stream;
(b) removing the N-comprising compound from the pH adjusted liquid waste stream, thereby obtaining a N-poor waste stream;
(c) optionally, concentrating the N-poor waste stream through water removal, preferably by a membrane distillation system, thereby obtaining a concentrated N-poor waste stream;
(d) separating at least part of the, optionally concentrated, N-poor waste stream into a first part and a second part; and,
(e) returning or recycling at least part of the, optionally concentrated, N-poor waste stream to the multi-compartment EDBM system, while:
(i) removing the monovalent ions transferred in step (a) from the first part of the, optionally concentrated, N-poor waste stream, preferably by contacting said, optionally concentrated, N-poor waste stream with a monovalent ion extraction means, preferably a monovalent cation exchange membrane; and,
(ii) removing monovalent anions, preferably Cl$^-$, from the second part of the, optionally concentrated, N-poor waste stream by contacting said, optionally concentrated, N-poor waste stream with a monovalent anion exchange membrane.

Steps (a) and (e) work in combination, since the target ions (e.g. $NH_4^+$, $K^+$, etc.) are removed from the N-poor (concentrated) stream or N—P—K poor (concentrated) stream to the liquid waste stream.

The recovery of N may be performed through recovery of a N-containing compound. The recovery is not limited to any specific form of N-containing compound; any form of N or N-containing compound may suitably be used as long as recovery thereof is possible using the herein described method and/or system. Suitable N-containing compounds may include: ammonia or ammonium-containing compounds, volatile amines such as triethylamine (Et3N), monoethylamine (MEA), and the like, isobutyldiurea, isobutylidenediurea (IBDU), urea, and so on, and/or combinations thereof. The latter list of exemplary compounds is to be regarded as non-limitative.

As used herein, a "monovalent ion extraction means" refers to a device or system which is substantially permeable to monovalent cations including protons, less permeable to multivalent metal cations, and substantially impermeable to anions (whether multivalent or monovalent). Selectivity for monovalent cation extraction from an optionally concentrated N-poor waste stream can be for example achieved by application of a suitably strong electric field over an ion extraction means having suitable monovalent properties. The monovalent ion extraction means may comprise a monovalent cation exchange membrane.

As used herein, a "monovalent cation exchange membrane" refers to a cation exchange membrane substantially permeable to monovalent cations including protons, less permeable to multivalent metal cations, and substantially impermeable to anions (whether multivalent or monovalent). "Substantially permeable" in the context of monovalent cation exchange membranes refers to the permeability ratio of monovalent cations to multivalent cations being greater than 1, and preferably being greater than 10. The selective extraction of monovalent cations can be ensured by combination of an applied electric field together with the monovalent properties of a monovalent cation exchange membrane. Preferably, the cation exchange membrane is a monovalent cation exchange membrane.

As used herein, a "monovalent anion exchange membrane" refers to an anion exchange membrane substantially permeable to monovalent anions, less permeable to multivalent anions, and substantially impermeable to cations (whether multivalent or monovalent). "Substantially permeable" in the context of monovalent anion exchange membranes refers to the permeability ratio of monovalent anions to multivalent anions being greater than 1, and preferably being greater than 10. The selective extraction of monovalent anions can be ensured by combination of an applied electric field together with the monovalent properties of a monovalent anion exchange membrane. Preferably, the anion exchange membrane is a monovalent anion exchange membrane.

As used herein, a "bipolar membrane" refers to a membrane comprising an anion-permeable layer and a cation-permeable layer. When used in conjunction with an electrical field, a bipolar membrane can efficiently dissociate a water molecule into a proton and a hydroxyl ion.

The present invention relates to a method for the recovery of N from a liquid waste stream. The liquid waste stream is preferably a stream of urine, a stream (e.g. water) comprising excreta (e.g. faeces, manure, digestate, fertilizer), or (concentrated) waste water, for example, municipal (e.g. sewage, septic) and/or industrial wastewater (e.g. food and feed industry, agriculture, mining, etc.); more preferably urine, such as human or animal urine; most preferably human urine.

This method is non-specific and independent of the type or source of a waste stream as long as the stream is liquid (i.e. has fluid properties) and its composition comprises N, and optionally K and P. The N, K, and P can each be present in low concentrations, i.e. lower than at most 100 mg/l for example 25 mg/l, 50 mg/l, 75 or 99 mg/l; in intermediate concentrations, i.e. between at least 100 mg/l and at most 10000 mg/l for example 500 mg/l, 1000 mg/l, 2500 mg/l, 5000 mg/l, or 7500 mg/l; or in high concentrations, i.e. higher than at least 10000 mg/l for example 15000 mg/l, 25000 mg/l or 50000 mg/l. Alternatively, the N (and optionally K and P) can also be present in varying concentrations, such as a low concentration of P, for example 50 mg/l P, an intermediate concentration of N, for example 1000 mg/l N, and a high concentration of K, for example 10000 mg/l K.

The term "waste stream" as used herein refers to (waste) water that has been adversely affected in quality by human or animal influence. In some embodiments the waste stream comprises (organic) matter discharged from a biological body, such as bacterial, animal or human. The organic matter can have a solid or semiliquid form such as faeces, manure, digestate of anaerobic digestors, or be fully liquid, such as urine. The waste stream may be wastewater not (yet) subjected to nitrification/denitrification, such as domestic wastewater. In other embodiments the waste stream comprises unusable or unwanted substances (e.g. industrial by-product or waste products) that are fully or partially dissolved, such as suspended or dissolved fly ash, wastewaters from industrial food and feed production or agriculture, other chemicals potentially harmful for human health. It is further noted that, although liquid streams are preferred for the present method, most solid forms (e.g. lumps, suspensions) can also be made sufficiently liquid through dissolving or mixing with a suitable solvent, such as water.

In some preferred embodiments the waste stream is a stream of urine, or is a stream comprising excreta (e.g. faeces, manure, digestate, fertilizer), or is (concentrated) wastewater, for example, municipal (e.g. sewage, septic) and/or is industrial wastewater (e.g. food and feed industry, agriculture, mining).

In some more preferred embodiments the waste stream is urine, more preferably human or animal urine; most preferably human urine. Urine has a much higher phosphate concentration than sludge water, allowing a simpler and less expensive process for precipitation of phosphates.

In some embodiments, the waste stream has a conductivity of at least 200 µS/cm, and contains at least 0.1 mass % N, more preferably at least 0.1 mass % N, 0.05 mass % P, most preferably at least 0.1 mass % N, 0.05 mass % P and 0.1 mass % K.

Preferred compositions for urine have no restrictions on pH or salt concentrations.

Preferably, the NH4-N concentration is at least 50 mg N/L

Preferred compositions for urine comprise $Cl^+$ and/or $SO_4^{2-}$ in molar equivalents to the NH4-N concentration Preferred compositions for the rinse solution comprise a NaCl solution. However any non-fouling, non-corrosive saline solution can be used. NaCl is preferred as in this instance HOCl is produced, which can be used as a cleaning agent for the EDBM stack.

In some preferred embodiments prior to step a), preferably wherein the waste stream is urine, the waste stream is hydrolysed. Presence of N as $NH_4^+$ is advantageous when N is recovered off-site. For example, hydrolysis can be ensured by mixing fresh urine with (partially) hydrolysed urine and allowing for 2 days of contact time (mixed) at room temperature (25° C.). Hydrolysed urine has a typical pH value of at least 9, and has >90% of all reduced N present as either the ammonium-ion or ammonia gas (dissolved); thus the pH is more optimal for the method and the N is present as ammonium. Additionally or alternatively, the method may comprise further steps to enhance the hydrolysis process: adding a hydrolysis catalyst such as urease (i.e. enzyme); heating to a temperature of 65° C. or higher; allowing and/or promoting (natural) bacterial growth in a non-sterile environment.

The liquid waste stream comprises an N-comprising compound.

The term "compound" as used herein refers to substance consisting of atoms or ions of two or more different elements in definite proportions joined by chemical bonds into a molecule. By extension, "N-comprising compound" thus refers to a compound comprising at least one N atom, preferably two or more N atoms. Examples include urea, isobutyldiurea, uric acid, ammonia, proteins, amino acids, (N from fish), and others. In some embodiments, the N-comprising compound is an organically bound N-compound; preferably ammonia, urea, isobutyldiurea, and/or an amine or amine-containing compound. All of the listed compounds can be measured through the Kjeldahl measurement method. In some preferred embodiments, the N-comprising compound is ammonia.

Similarly, a K-comprising compound comprises at least one K atom, preferably two or more K atoms. Examples include the potassium ion ($K^+$), KCl, $K_2CO_3$, $K_2SO_4$, $KNO_3$, and others. A P-comprising compound comprises at least one P atom, preferably two or more P atoms. Examples include phosphate ions, (orthophosphate), phosphoric acid, all types of inorganic and organic phosphate salts, and organically bound phosphates (e.g. DNA, surfactants, etc.) and others.

The method preferably comprises the following step:

(a) increasing the pH of the liquid waste stream and transfer of monovalent cations by contacting said liquid waste stream simultaneously with the $OH^-$ producing side of the bipolar membrane and with a monovalent cation exchange membrane of the multi-compartment EDBM system, thus obtaining a pH adjusted liquid waste stream.

In some embodiments, during step (a), the pH is increased to from at least 7 to at most 14; preferably at least 8 to at most 13, preferably at least 9 to at most 12, most preferably at least 10 to at most 11. The preferred value of pH 10 to 11 allows for a most efficient removal of ammonia because $NH_3$ is present in a concentration of above 95%, for example 97% or 99%. A pH increase allows for all $NH_4^+/NH_3$ to be present as $NH_3$. At pH 10, more than 95% is present as $NH_3$, at pH 11 this is more than 99%. However, a further pH increase requires more power to the EDBM stack without having a significant influence on the $NH_3$ concentration, and thus vapour pressure required for the recovery in the N recovery system. Additionally, a pH above 11 reduces the purity of the product recovered in the crystallizer system, as more co-precipitates such as $Mg_3(PO_4)_2$ are produced. A pH lower than 10 reduces the presence of $NH_3$ and thus the speed of removal. Additionally, a lower pH reduces the recovery of P and K in the crystallizer, as incomplete precipitation occurs at this lower pH. The inventors have found that a pH in the above ranges, and preferably between 10 and 11, provides an optimal balance. Other suitable pH ranges include: at least 8 to at most 14; at least 9 to at most 14; at least 10 to at most 14; at least 7 to at most 13; at least 9 to at most 13; at least 10 to at most 13; at least 7 to at most 12; at least 8 to at most 12; at least 10 to at most 12; at least 11 to at most 12; at least 7 to at most 11; at least 8 to at most 11; at least 9 to at most 11.

The method preferably comprises the following step:
(b) removing the N-comprising compound from the pH adjusted liquid waste stream, thereby obtaining a N-poor waste stream.

This removal may use any type of N-removal technology.

In some embodiments, after step (b) the concentration of N in the N-poor waste stream is at most 100.0 mg/l; preferably 75.0 mg/l; more preferably 50.0 mg/l; most preferably 25.0 mg/I; for example 20.0 mg/l; with the total concentration of N in the waste stream as measured using the Kjeldahl measurement method according to ISO 5663:1984.

In some embodiments during step (b) at least 80.0% of reduced N (in which N has a negative oxidation state) is removed; preferably 90.0%; more preferably 95.0%; most preferably 98.0%; for example about 99.0%; with the % based on the total amount of N in the waste stream as measured using the Kjeldahl measurement method according to ISO 5663:1984, which is a method for the quantitative determination of organic nitrogen in chemical substances like ammonia.

In some embodiments after step (b) the N-poor waste stream comprises at most 0.01 wt. % N for example 0.009 wt. % or 0.007 wt. %; preferably at most 0.005 wt. % for example 0.004 wt. % or 0.002 wt. %; more preferably at most 0.001 wt. % for example 0.0009 wt. % or 0.0007 wt. %; most preferably at most 0.0005 wt. % for example 0.0004 wt. %, 0.0002 wt. %, 0.0001 wt. % or lower; with the wt. % based on the total weight of the N-poor waste stream.

In some preferred embodiments, in step (b) the pH adjusted liquid waste stream is contacted with an acidified receiving solution via a membrane for transferring the N-comprising compound to the acidified receiving solution, preferably in a membrane contactor unit.

The term "solution" hereby refers to a liquid mixture in which the minor component (i.e. the solute) is uniformly distributed within the major component (i.e. the solvent). The term "concentrated solution" hereby refers to a solution with an increased concentration of solute compared to the initial (provided) solution, contrary to a "poor solution", which instead refers to a solution with a decreased concentration of solute.

The acidified receiving solution may be any inorganic acid (e.g. HCl, $H_2SO_4$, $H_3PO_4$, $H_2S$, $HNO_3$, etc.), any organic acid (formic, acetic, propionic, oxalic, citric acid), or a solution that can be acidified in the EDBM process, which is any type of watery solution. The acidified receiving solution may also be water. Typically, the anions come in from the returning urine; the protons come in from the bipolar membrane in the EDBM.

If a neutral solution is used without any form of buffering capacity, then the N-comprising compound can only be recovered to a certain percentage, as the vapour pressure (the driving force in the N-removal system) will be the same at both sides of the membrane distillation membrane. By acidifying this solution, the vapour pressure at the acid side of the membrane is kept low, allowing for more N to be transported to this side.

The choice of choosing an inorganic or organic acid may influence the market price of the end product (acidified solution containing the N), and as such the profitability of the method.

In some preferred embodiments, the acidified receiving solution comprises a water stream, which is recirculated at the $H^+$ producing side of the bipolar membrane and which simultaneously captures the monovalent anions, preferably $Cl^-$, removed in step (e) from the, optionally concentrated, N-poor waste stream. The advantage of the watery solution used in EDBM is that a) any type of watery solution can be used, b) no transport costs have to be paid to transport external solutions, and, c) there are no safety hazards.

In some preferred embodiments, the water stream comprises water recovered from the pH adjusted liquid waste stream in step (c). This removes the need to transport a different watery stream and provides a completely closed system, without any need for external chemicals.

In some preferred embodiments, the N-comprising compound removed in step (b) is ammonia, which is recovered in the acidified receiving solution as $NH_4Cl$.

The method optionally comprises the following step:
(c) optionally, concentrating the N-poor waste stream through water removal, preferably by a membrane distillation system, thereby obtaining a concentrated N-poor waste stream.

This step allows for compatibility with existing systems, for example as described in In some embodiments, the removal of water is performed until the water removal is at least 50.0%; preferably at least 60.0%; more preferably at least 70.0%; most preferably at least 80.0%; wherein 100.0% is the total amount of water present in the N-poor waste stream.

In some embodiments step b. is performed until the water removal is at least 50.0% and at most 99.0%; preferably at least 60.0% and at most 95.0%; more preferably at least 70.0% and at most 92.0%; most preferably at least 80.0% and at most 90.0%; wherein 100.0% is the total amount of water present in the N-poor waste stream.

When this step is present, water can be recovered for reuse. If the K and P concentrations of the influent are relatively low, the concentrator can increase those concentrations to allow for more complete K and P recovery.

When this step is not present, the method is preferably interfaced in the same way: from N-removal system back to EDBM system (channel 1 and 4). No significant changes in EDBM performance are expected, however, due to the beneficial effect of concentration on the crystallization step (faster kinetics). An advantage is that the energy demand of the total installation (without concentrator) will be lower.

The method comprises the following step:
(d) separating at least part of the, optionally concentrated, N-poor waste stream into a first part and a second part.

Separating the stream into two separate parts allows to both recover valuable ions (i.e. K, $NH_4^+$) into the liquid waste stream as well as recover anions (i.e. $Cl^-$, $SO_4^{2-}$) into the acidified stream. If this stream is not separated into two parts, only one of these operations can be fulfilled. Additionally, not splitting this stream will have the effect that the electrode rinse stream will be spent in the long run, as ions are continuously being removed from this stream.

In some embodiments, at least 10% by volume of the, optionally concentrated, N-poor waste stream is separated into a first part and a second part, preferably at least 20%, preferably at least 30%, preferably at least 40%, preferably at least 50%, preferably at least 60%, preferably at least 70%, preferably at least 80%, preferably at least 90%, for example at least 95%, for example at least 98%, for example at least 99%, for example about 100%. Only partial re-use of the N-poor waste stream is possible as this N-poor stream is very rich in ions, particularly when concentrated.

In some embodiments, the separation stream into a first part and a second part is performed at a volume ratio from 10:90 to 90:10, preferably from 20:80 to 80:20, preferably from 30:70 to 70:30, preferably from 40:60 to 60:40, preferably from 45:55 to 55:45, preferably from 48:52 to 52:48, preferably from 49:51 to 51:49, preferably about 50:50. Preferably, sufficient ions are available in both parts of the N-poor stream.

The method preferably comprises the following step:
(e) returning or recycling at least part of the, optionally concentrated, N-poor waste stream to the multi-compartment EDBM system, while:
  (i) removing the monovalent ions transferred in step (a) from the first part of the, optionally concentrated, N-poor waste stream, preferably by contacting said, optionally concentrated, N-poor waste stream with a monovalent cation exchange membrane; and,
  (ii) removing monovalent anions, preferably Cl$^-$, from the second part of the, optionally concentrated, N-poor waste stream by contacting said, optionally concentrated, N-poor waste stream with a monovalent anion exchange membrane.

Removal of target monovalent ions (K, $NH_4^+$) further increases the recovery of these ions. For $NH_4^+$, this means that $NH_4^+$-ions can be transferred back to the liquid waste stream, after which they can be recovered to the acidified waste stream. For K$^+$, this means that the K:P ratio is higher in the crystallizer, and as such less co-precipitation can be expected.

In some preferred embodiments, the method further comprises the step of recovering P and/or K from said, optionally concentrated, N-poor waste stream, thus obtaining an, optionally concentrated, N—P—K-poor waste stream. Preferably this removal occurs through crystallization, for example with a nucleating agent, preferably by addition of Mg ions.

The term "nucleating agent" as used herein refers to a substance used to modify the properties of a solution by promoting nucleation to create a solid from a solution. The solid formed is called the 'precipitate'; the chemical that causes the solid to form is also called the 'precipitant'. Examples of nucleating agents (precipitants) suitable for the present method include $MgCl_2$ or MgO. Examples of K/P-comprising compounds (precipitates) suitable for the present method include potassium struvite.

In some preferred embodiments, the step of recovering P and/or K is performed after step (c) by addition of $MgCl_2$ and subsequent recovery of K-struvite crystals. In some preferred embodiments, in step (e) at least part of the, optionally concentrated, N—P—K-poor waste stream is returned to the multi-compartment EDBM system.

In some embodiments, the recovery of P is performed until the concentrated solution contains a P concentration of at least 50 mg/l for example 75 mg/l or 90 mg/l; preferably at least 100 mg/l for example 250 mg/l, 500 mg/l or 750 mg/l; more preferably 1000 mg/l for example 2500 mg/l, 5000 mg/l or 7500 mg/l; most preferably 10000 mg/l for example 12000 mg/l, 13000 mg/l or 15000 mg/l. In some embodiments, the removal of K is performed until the concentrated solution contains a K concentration of at least 100 mg/l for example 200 mg/l, 300 mg/l or 400 mg/l; preferably at least 500 mg/l for example 600 mg/l, 750 mg/l or 900 mg/l; more preferably at least 1000 mg/l for example 1250 mg/l, 1500 mg/l or 1750 mg/l; most preferably at least 10000 mg/l for example 11000 mg/l, 12000 mg/l or 15000 mg/l. The minimum concentration of 50 mg/l provides that the method is able to produce enough product containing sufficient K and P. By increasing the concentration more amount of product can be produced at similar or better quality, the waste products (effluents) may contain less total nutrients (reducing associated costs), and the precipitation process may produce more K/P-comprising compounds per unit time; the upper concentration can be raised as long as the liquid properties (e.g. viscosity) remain unaltered.

In some preferred embodiments the nucleating agent in step c. is a Mg-comprising compound; more preferably the nucleating agent is $MgCl_2$ and/or MgO; most preferably the nucleating agent is a concentrated $MgCl_2$ solution and/or MgO. Alternatively, a sacrificial magnesium electrode could be used, as well as any solution containing Mg-ions in a concentration above 1.0 g/l, for example seawater or a solution of other Mg-salts, or a solid which, when dissolved in a solvent, will release $Mg^{2+}$ ions. However, MgO and/or $MgCl_2$ are preferred because these salts dissolve well and sufficiently release $Mg^{2+}$-ions, as well as (in the case of MgO) provide OH– ions to increase the pH. Accordingly, MgO and/or $MgCl_2$ further improve the precipitation of a K/P containing compound. Another alternative is an electrochemical cell that can provide half-cell reactions.

In some embodiments the $Mg^{2+}$ concentration as added in the concentrated solution is at least 1.0 g/l, for example 2.0 g/l, 3.0 g/l or 4.0 g/l; preferably at least 5.0 g/l, for example 6.0 g/l, 7.5 g/l or 9.0 g/l; more preferably at least 10.0 g/l, for example 20.0 g/l, 30.0 g/l or 40.0 g/l; most preferably at least 50.0 g/l, for example 60.0 g/l, 75.0 g/l or 100.0 g/l. Providing a minimum Mg concentration of 1.0 g/l allows for sufficient precipitation of a K/P containing compound to produce enough product containing K and P. By increasing the $Mg^{2+}$ concentration more amount of product can be produced, thus the upper concentration can be raised as long as the liquid properties remain unaltered (e.g. viscosity). Therefore a nucleating agent containing a very high concentration of Mg works best, as it contributes very little volume and as such does not dilute the concentrated solution.

In some embodiments the average dosage speed of Mg concentration added to the concentrated solution is adjusted to the P concentration in concentrated solution measured using the Scheel method according to Scheel K. C. (1936) as published in Anal. Chem. 105, 256-269 hereby incorporated by reference. Preferably, the average dosage speed of Mg concentration is at least 1.0 mg×mol $Mg^{2+}$ per mol P to at most 1.5 mg×mol $Mg^{2+}$ per mol P; preferably at least 1.1 mg×mol $Mg^{2+}$ per mol P to at most 1.4 mg×mol $Mg^{2+}$ per mol P for example 1.2 mg×mol $Mg^{2+}$ per mol P or 1.3 mg×mol $Mg^{2+}$ per mol P. When the P concentration is determined by the Scheel method, Mg should preferably be added in equimolar amounts to the P treated within an hour. Advantageously at least 1.0 mg×mol $Mg^{2+}$ per mol P is dosed using the Mg solution, otherwise the Mg concentration may be too low to produce the entire possible K/P compound from the available K and P. However, when more than 1.5 mg×mol $Mg^{2+}$ is dosed per mol P, the high $Mg^{2+}$ concentration may start co-precipitation of undesired Mg-phosphates, thus preventing the precipitation of a K/P comprising compound.

Alternatively, other K/P-comprising compound can be obtained, albeit a reduced chemical or operational efficiency. Alternatives include $MgNH_4PO_4.6H_2O$, which can be precipitated if the provided ammonia removal in step b. is incomplete; or $Mg_3(PO_4)_2 \cdot xH_2O$, which can be precipitated in the absence of potassium ions; or $CaKPO_4 \cdot xH_2O$ and/or calcium phosphates, which can be precipitated if instead of a Mg-source a Ca-source is used instead. However, the maximum solubility of the Mg/P comprising compound should preferably be 1 g/L or too much P may be lost to the effluent. A combination of the latter with a K/P comprising compound is also possible.

In some preferred embodiments, the method further comprises the step of rinsing the electrodes with a rinsing solution, preferably wherein the rinsing solution comprises NaCl, which is recirculated between the anode and the cathode, and preferably generating NaOCl in said rinsing solution. Such a solution can be used for cleaning the other compartments of the installation, as it has a strong bactericidal and oxidative effect. Effectively cleaning surfaces is preferred to keep the system up and running for extended periods of time. The advantage is that this process occurs simultaneous with all other processes, and as such, this makes the overall configuration more valuable.

In some preferred embodiments, the liquid waste stream, preferably the liquid waste stream comprising urine, is filtered prior to step (a), preferably to remove particulate matter. The particulate matter also comprises salts that may precipitate during a pH increase (e.g. $CaCO_3$) as well as dissolved organic matter that may lead to bacterial growth. This step has the advantages that there is less blockage (and consequently downtime), less maintenance (and consequently downtime), lower viscosity and thus higher ion current, less cleaning necessary, and a reduced risk of process failure due to membrane destruction (if dead zones occur due to occurrence of fouling layers).

In some embodiments, a voltage per repeating unit of cells (typically a combination of AEM/CEM/BPM/MAEM) is at most 4V per repeating unit of cells placed in series. This voltage may be higher when more cells are placed in parallel; where up to 200 V may be possible.

In some embodiments, the method comprises the step of removing of the liquid waste stream waste, preferably after passing said waste stream at least once through the EDBM system configured for performing the method of recovery of N. The removing may be performed after passing said waste stream a plurality of times through the system, such as two or three times, to further increase the removal of, preferably monovalent, cations and/or anions. A generic working example of a method according to an embodiment of the invention is detailed below, and illustrated in FIG. 2A.

Urine enters the EDBM system, and is contacted with the (concentrated) N—P—K-poor waste stream that has been subjected to both N-removal technology (preferably membrane distillation) as well as optional P—K removal technology (preferably crystallization) by means of a monovalent cation exchange membrane in the EDBM system. This membrane allows passage of: possible remaining $NH_4$, Na and K.

After this, the urine, that has been enriched with $NH_4$, Na and K, goes to the N-removal technology (preferably membrane distillation), and subsequently to a possible concentration step, and after that to the K—P removal technology (preferably crystallization). Finally, this (concentrated) N—P—K-poor waste stream is then split in 2 separate streams and sent back to the EDBM system: one part is sent to be contacted with the urine to recover $NH_4$, Na and K, still present in this waste stream; and one part is contacted with the acidic stream that is used in the membrane distillation (N removal) system by means of an anion exchange membrane, to transfer $Cl^-$ as a counter-ion for the $H^+$-production of the bipolar membrane.

According to a second aspect, the present invention relates to a system suitable for use in the method according to the first aspect, or embodiments thereof. Therefore, the present invention also relates to a system for the recovery of N, and optionally P and/or K, from a liquid waste stream, preferably a liquid waste stream comprising urine. The recovery of N and optionally P and/or K may be performed through recovery of an N-containing compound, and optionally P and/or K-containing compound. The recovery is not limited to any specific compound as long as recovery thereof is possible using the herein described system.

The system preferably comprises:
- a multi-compartment electrodialysis bipolar membrane (EDBM) system, comprising an anode and cathode electrode, a first flow channel, provided at the anode side of the EDBM system and bound by a monovalent cation exchange membrane, a second flow channel, bound by the monovalent cation exchange membrane and the OH– producing side of a bipolar membrane, having an inlet for providing the liquid waste stream, preferably the liquid waste stream comprising urine, to the second flow channel; a third flow channel, bound by the H+ producing side of a bipolar membrane and a monovalent anion exchange membrane, and a fourth flow channel, provided at the cathode side of the EDBM system and bound by the monovalent anion exchange membrane, and preferably, two rinse channels, each bound by an electrode and an anion exchange membrane and provided adjacent to the first and fourth flow channel wherein the first channel is bound by an anion exchange membrane and the monovalent cation exchange membrane, and wherein the fourth channel is bound by an anion exchange membrane and the monovalent anion exchange membrane;
- a unit for the recovery of N, wherein an inlet of said unit is connected to an outlet of the second flow channel and to an outlet of the third flow channel; and,
- optionally, a concentrator, wherein an inlet of said concentrator is connected to an outlet of the unit for the recovery of N, configured for concentrating the waste stream after passing through the second flow channel and the unit for the recovery of N by removal of water, thus allowing to obtain a concentrated N-poor waste stream, and wherein an outlet of said concentrator is connected to an inlet of the first and the fourth flow channel, configured to return at least part of the concentrated N-poor waste stream to the multi-compartment EDBM system.

The EDBM system comprises an anode electrode, a cathode electrode, a bipolar membrane, at least one cation exchange membrane and at least one anion exchange membrane; and preferably an ion extraction means. The ion extraction means may comprise a cation exchange membrane.

In some preferred embodiments, the multi-compartment EDBM system comprises a cathode electrode, an anode electrode, a first flow channel, provided at the anode side of the EDBM system and bound by a monovalent cation exchange membrane, a second flow channel, bound by the monovalent cation exchange membrane and the OH– producing side of a bipolar membrane, a third flow channel, bound by the $H^+$ producing side of a bipolar membrane and a monovalent anion exchange membrane, and a fourth flow channel, provided at the cathode side of the EDBM system and bound by the monovalent anion exchange membrane, and preferably a monovalent ion extraction means. The EDBM system also comprises two rinse channels, each bound by an electrode and an anion exchange membrane and provided adjacent to the first and fourth flow channel, wherein the first channel is bound by an anion exchange membrane and the monovalent cation exchange membrane, and wherein the fourth channel is bound by an anion exchange membrane and the monovalent anion exchange membrane. The monovalent ion extraction means may comprise a monovalent cation exchange membrane.

In some embodiments, the system comprises:
a multi-compartment electrodialysis bipolar membrane (EDBM) system, comprising an anode and cathode electrode, a first flow channel, provided at the anode side of the EDBM system and bound by a monovalent cation exchange membrane, a second flow channel, bound by the monovalent cation exchange membrane and the OH– producing side of a bipolar membrane, having an inlet for providing the liquid waste stream, preferably the liquid waste stream comprising urine, to the second flow channel; a third flow channel, bound by the H⁺ producing side of a bipolar membrane and a monovalent anion exchange membrane, and a fourth flow channel, provided at the cathode side of the EDBM system and bound by the monovalent anion exchange membrane, and preferably, two rinse channels, each bound by an electrode and an anion exchange membrane and provided adjacent to the first and fourth flow channel wherein the first channel is bound by an anion exchange membrane and the monovalent cation exchange membrane, and wherein the fourth channel is bound by an anion exchange membrane and the monovalent anion exchange membrane, and preferably a monovalent ion extraction means.

In some preferred embodiments, the anode electrode is resistant to chlorine attack with HOCl. In some preferred embodiments, both bipolar membranes and all ion exchange membranes are suited to both high (at most 12) and low (at least 2) pH.

In some embodiments, the system comprises a unit for the recovery of N. Preferably, an inlet of said unit is connected to an outlet of the second flow channel and to an outlet of the third flow channel (where the acid is produced that captures the N compound).

In some preferred embodiments, the unit for the recovery of N is a membrane contactor unit having a first and a second compartment, wherein an inlet of the first compartment is connected with the outlet of the second flow channel and wherein an outlet of the first compartment is connected to the concentrator, wherein an inlet of the second compartment is connected with an outlet of the third channel of the EDBM system.

In some embodiments, the system comprises a concentrator. Preferably, an inlet of said concentrator is connected to an outlet of the unit for the recovery of N, configured for concentrating the waste stream after passing through the second flow channel and the unit for the recovery of N by removal of water, thus allowing to obtain a concentrated N-poor waste stream, and wherein an outlet of said concentrator is connected to an inlet of the first and the fourth flow channel, configured to return at least part of the concentrated N-poor waste stream to the multi-compartment EDBM system. When the concentrator is not present, the method is preferably interfaced in the same way: from N-removal system back to EDBM system (channel 1 and 4).

In some embodiments the system comprises a water removal unit configured for concentrating the N-poor waste stream through water removal to obtain a concentrated solution. The water removal unit may remove water by applying a vapour pressure gradient; preferably via low grade waste or solar heat. Preferably the water removal unit is an air gap membrane distillation (AGMD) device. Advantageously, the water removal unit can be adapted to use any modular configuration. Advantageously the water removal unit can use a hydrophobic or omniphobic membrane type, which allows easy scaling from low scale (~1 l/h) to large scale (100 m³/h and higher) production. Additionally or alternatively, water may be removed using reverse osmosis using any type of commercial RO membrane and module size, as long as the salt removal is sufficient. Typically, buffer basins may be placed between the different modules, and any type of commercial displacement pump (e.g. piston, membrane, positive) can be used.

In some preferred embodiments, the concentrator is a membrane distillation system configured for concentration of the waste stream after passing through the second flow channel and the unit for the recovery of N, and wherein the system is configured for recycling the water removed from the waste stream in the concentrator to the third flow channel.

In some preferred embodiments, the system further comprises a crystallizer unit configured to recover P and K through crystallization from a concentrated waste stream, wherein the inlet of the crystallizer unit is connected to the outlet of the concentrator and the outlet of the crystallizer unit is connected to the first and fourth flow channel.

In some embodiments the apparatus comprises a crystallizer unit or crystallisation unit configured for adding a nucleating agent to the concentrated solution (step c) and precipitating a K/P-comprising compound from the concentrated solution. Preferably an Mg-source is added to induce precipitation of a K/P-comprising compound. Ideally, the crystallisation unit is a tube-and-baffle reactor or a fluidized bed reactor with an upward flow to induce sufficient K/P-comprising compound (crystal) growth. The K/P-comprising compounds (as crystals) are collected in a collection section that may be located at the bottom of the unit. Advantageously the collection section can be drained under gravity or pumped out. The (clean) water can flow out via an overflow weir. The crystallisation unit is preferably circular in shape, but can be rectangular if desired, and contains baffles to induce sedimentation of crystals. Upward flow can be induced by a pump or an impeller. The reactor can easily be scaled from low scale (~1 l/h) to large scale (100 m³/h and higher) production by increasing the reactor size, while keeping the relative proportions in place.

In some embodiments the system comprises a means for pumping the waste stream comprising N from a storage container, such as a vessel, to the apparatus; or alternatively, directly for pumping the waste stream directly from the waste stream source. In some preferred embodiments the apparatus is configured for scaling the production from a low scale (~1 l/h) to a large scale (100 m³/h and higher) production.

In some embodiments, the system comprises a waste stream removal unit configured for removal of the waste stream. The waste stream may be removed after sufficient recovery of desired, preferably monovalent, cations and/or anions is achieved. Additionally or alternatively, the system may comprise a waste container for storing waste stream. The waste stream may flow into said container or be actively pumped therein. The stored waste stream may also be returned back to the system in case further recovery of N is desired.

A generic working example of a system according to an embodiment of the invention is detailed below, and illustrated in FIG. 1.

The system typically consists of an electrochemical membrane stack consisting of:
- an anode and cathode electrode (no specified material);
- a bipolar membrane;
- one or several cation and anion exchange membranes; and,
- a feed solution containing target compounds in complex mixture.

Figure 2A:
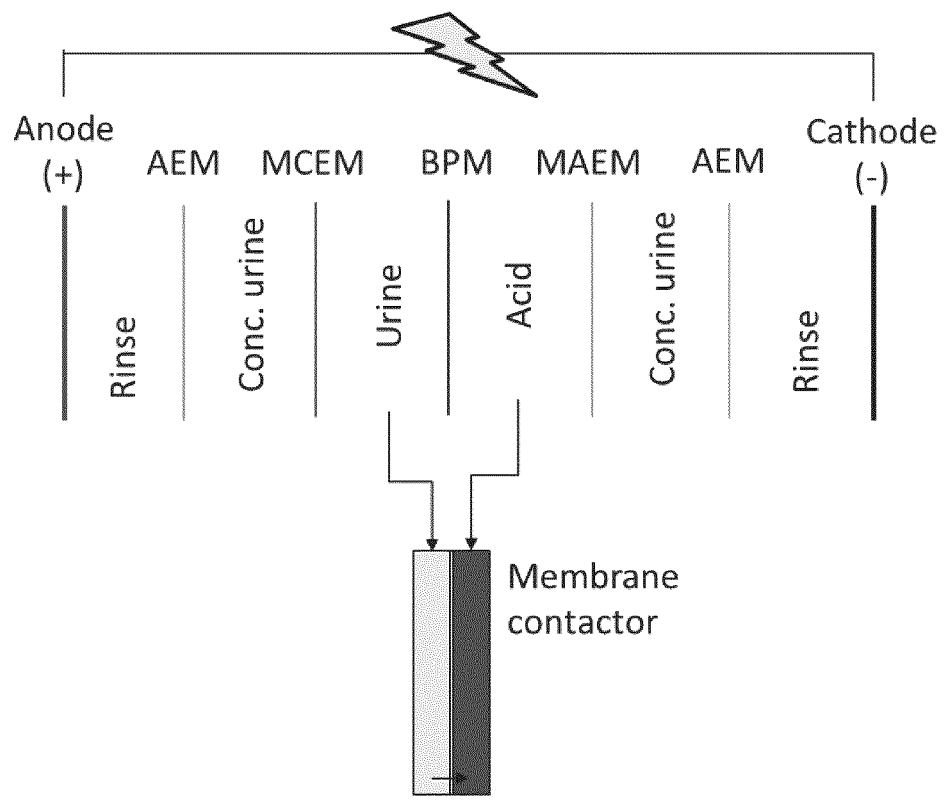
FIG. 2A illustrates an EDBM stack according to an embodiment of the invention, which was used for the real urine experiments.

In some embodiments, the system may comprise a single electrochemical membrane stack; an exemplary embodiment thereof is illustrated in FIG. 2A.

Figure 2B:
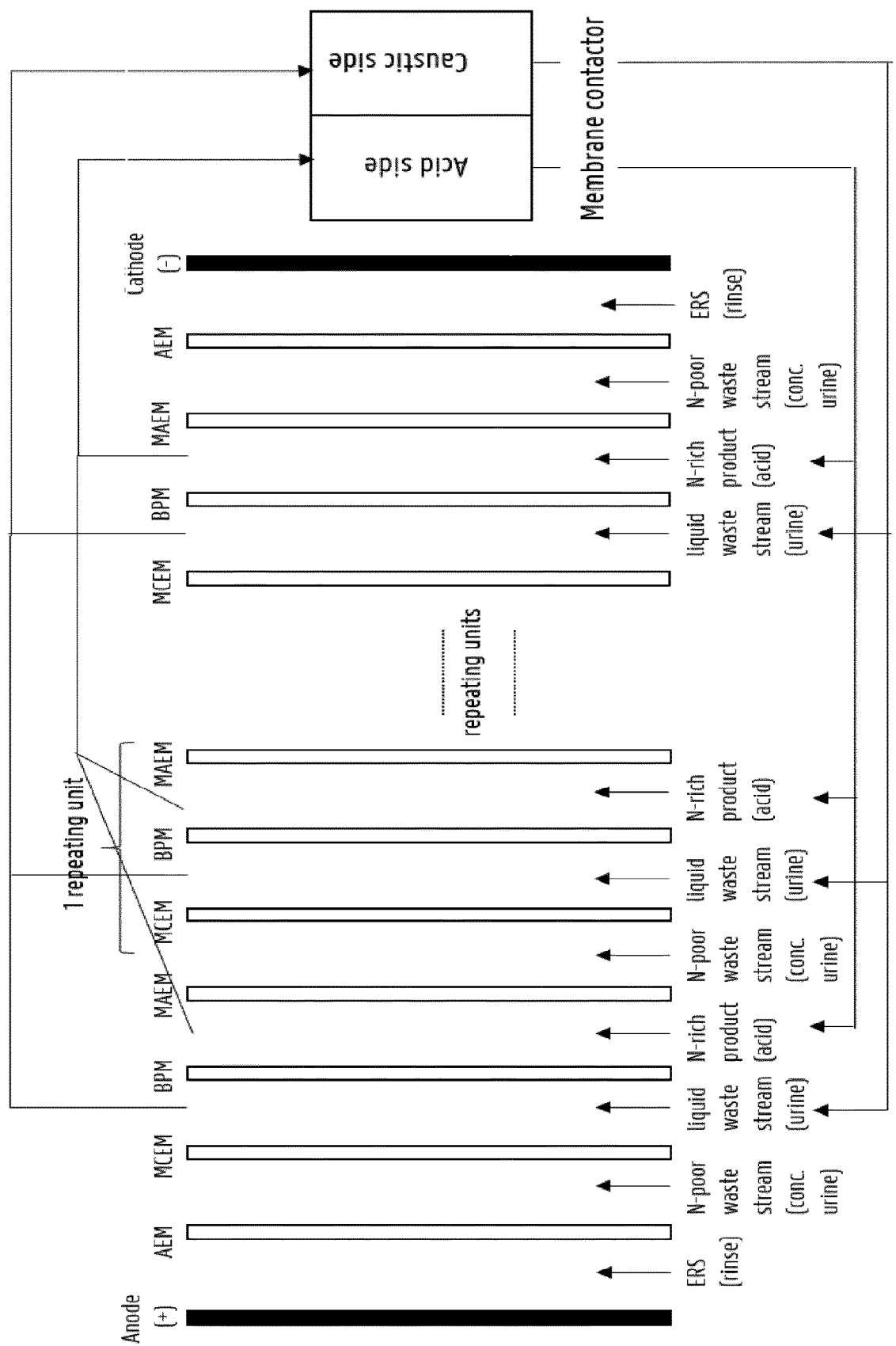
FIG. 2B illustrates an EDBM stack comprising multiple cell pairs according to an embodiment of the invention.

In some embodiments, the system may comprise a plurality of electrochemical membrane stacks, each stack consisting of
- a bipolar membrane;
- one or several cation and anion exchange membranes; and,
- a feed solution containing target compounds in complex mixture;

wherein the system comprises an anode and cathode electrode (no specified material), which may be unique for each stack or may be shared by the plurality of stacks. Preferably, a single anode and a single cathode electrode are provided disposed at the first stack and the last stack, respectively. The plurality of stacks may be arranged as repeating units in series; an exemplary embodiment thereof is illustrated in FIG. 2B. There is no limitation on the amount of repeating units; for example, a system may comprise 2 stacks, 3 stacks, 10 stacks, or more. A system comprising a plurality of stacks may improve the recovery of monovalent ions recovery and/or with greater efficiency.

Preferably the system, preferably comprising at least one electrochemical membrane stack, is expanded with one or more (preferably all) of following elements:
- a membrane contactor (for energy-efficient removal of ammonia from the feed solution) and membrane distillation system (for concentration of the feed solution); and/or,
- a crystallizer unit (for recovery of phosphate and potassium through crystallization).

In an exemplary system, the waste solution goes through following chronological treatment:
Feed solution enters the EDBM system at the $OH^-$ producing side of the bipolar membrane. Monovalent ions are removed to the concentrated, treated feed through a cation exchange membrane (see further).

The feed solution now has a high vapour pressure of ammonia and is sent to the membrane contactor side, where it is contacted with the acidified receiving solution. This receiving solution is initially a tap water/DI water stream, which is recirculated at the $H^+$-producing side of the bipolar membrane. Monovalent ions ($Cl^-$) are transported to this receiving solution from the concentrated, treated feed, producing an $NH_4Cl$ solution.

The feed solution is devoid of ammonia, and is sent to the membrane distillation system for concentration and recovery of DI water (which can be used as receiving solution).

The concentrated feed solution is sent to the crystallizer, where Mg-ions are added (through dosage of $MgCl_2$), and K-struvite precipitation and sedimentation occurs.

The treated, concentrated feed solution is again recirculated to the EDBM system to receive $Na^+$-ions from the feed stream and donate $Cl^-$ ions to the acidified receiving solution.

The electrode rinse solution (ERS), consisting of a NaCl solution, is recirculated on both electrodes and as such contains HOCl through half-reaction with the $Cl^-$. This solution can be used to clean membranes, spacers and the further installation when fouling occurs.

The EDBM system can be easily changed in such a way that all solutions can be acidified (if needed for stabilization—e.g. for urea recovery from urine) or the pH can be increased. The additional electrodialysis properties can serve for further desalination if necessary.

According to a third aspect, the present invention relates to the use of the system according to the second aspect, or embodiments thereof, for the recovery of N, and optionally P and/or K, from a liquid waste stream, preferably a liquid waste stream comprising urine.

Other uses may be in the nutrient and resource recovery sector could be seen, such as:
- nutrient recovery from animal and human waste streams with high nutrient loads;
- metal recovery from mining wastes, including extraction; and/or,
- improved ammonia recovery from gas strippers.

The present invention also relates to the use of the system according to the second aspect, or embodiments thereof, for the recovery of N, and optionally P and/or K, from a liquid waste stream from mining. The system may provide acidic extraction as well as caustic precipitation with e.g. sulphides or sulphates, a system which is used in e.g. copper mining. Other examples could include mining of lithium from salt-rich wastewaters. Advantages of the use of such wastewaters include the absence of dangerous chemicals e.g. inorganic acids and bases, the reduced need of electrode surface (as one cell pair can be repeated up to 50 times), and selective extraction of monovalent ions if desired.

EXAMPLES

Example 1

Several tests were performed on a lab-scale system consisting of an electrodialysis with bipolar membrane stack and a membrane contactor, with both synthetic and real urine streams.

Materials and Methods

The setup used is depicted in FIG. 1, consisting of four feed solutions, an EDBM stack coupled to an electron source (DC electricity source) and a membrane contactor (membrane stripping process from SATURN). Solutions were recirculated using Masterflex L/S peristaltic pumps (Cole-Palmer, USA) at a flow rate of 100 mL/min. During the first 10 minutes, the solutions were recirculated without a potential in the EDBM stack, to allow equilibration within the EDBM stack and to flush out air.

Experiments with real urine: Rinse: 0.5 M NaCl solution, Concentrated urine: 5× concentrated urine solution, urine: hydrolysed urine collected from healthy individuals with composition shown in Table, of which the pH was adjusted to pH 10 prior to the experiment (to ensure the acid side does not reach a pH value too low for the membranes, as an equivalent amount of protons and hydroxyl ions are produced), acid: initially DI water, pH gets adjusted during process. Of all the solutions, an initial volume of 1 L was used.

Experiments with synthetic urine: see composition in Table 1.

EDBM Stack and Electron Source

The EDBM stack was assembled using membranes provided by PCA GmbH (Germany) as shown FIG. 2A (valid for the real urine experiments). Between the membranes, an electricity conducting spacer was used. In the synthetic urine experiments, the MCEM membrane between urine and concentrated urine was an AEM membrane. However, due to diffusion, OH– was lost to concentrated urine and then to the rinse solution, hampering the process (see further). Each of the membranes used had a width and length of 0.1 m. The DC electricity source (AFX 2930SB), used was capable of delivering up to 30V.

Synthetic Urine Experiments

For the synthetic urine experiments, solutions were prepared with a composition shown in Table 1. All chemicals used were of analytical grade.

membrane surface had a length of 0.25 m and a width of 0.05 m. Temperature of the urine and ammonia water solutions was controlled using a 1 kW submersible heater at the urine side (50° C., Polyscience, USA) and a 2.2 kW temperature control unit at the ammonia-water side (20° C., VWR, Belgium) to ensure rapid transfer of ammonia across the membrane. For the concentration of the human urine (to produce the concentrated urine stream), the same setup was used without the connection to the EDBM setup. At the urine side, unconcentrated human urine was used, while at the acid side, a solution of 0.5 M $H_2SO_4$ was used. During this experiment, the volume of the urine side was measured and the experiment was stopped as soon as a concentration factor of 5 was achieved.

Measurements pH was measured using a handheld pH probe (Consort, Belgium). Temperature of all solutions was logged using a Pt100-electrode (Consort, Belgium).

Concentration of Na, K, Ca and Mg was measured using a Vista ICP-OES (Varian, USA). TOC was measured using a TOC-Vcpn (Shimadzu, Japan). Ammonium concentrations

TABLE 1

Composition of the solutions used in the experiments with synthetic urine

| Component | Urine | | Conc. urine | | Ammonia water | | ESO | |
|---|---|---|---|---|---|---|---|---|
| NaCl | 4.6 | g/L | 46 | g/L | 0 | g/L | 0 | g/L |
| $NaSO_4$ | 2.3 | g/L | 23 | g/L | 0 | g/L | 0 | g/L |
| $CaCl_2 \cdot 2H_2O$ | 0.65 | g/L | 6.5 | g/L | 0 | g/L | 0 | g/L |
| KCl | 1.78 | g/L | 17.8 | g/L | 0 | g/L | 0 | g/L |
| $Na_3C_6H_8O_7 \cdot 2H_2O$ | 0.65 | g/L | 6.5 | g/L | 0 | g/L | 0 | g/L |
| $Na_2C_2O_4$ | 0.02 | g/L | 0.2 | g/L | 0 | g/L | 0 | g/L |
| $C_4H_7N_3O$ | 1.1 | g/L | 11 | g/L | 0 | g/L | 0 | g/L |
| $KH_2PO_4$ | 3.29 | g/L | 32.9 | g/L | 0 | g/L | 0 | g/L |
| $NH_4Cl$ | 17.68 | g/L | 0.35 | g/L | 0 | g/L | 0 | g/L |
| $NaNO_3$ | 0 | g/L | 0 | g/L | 0 | g/L | 85 | g/L |
| Initial pH | 9.23 | Initial pH | 10 | Initial pH | 7 | | | |

Real Urine Experiments

For the real urine experiments, urine was collected from healthy males, with a composition as shown in Table 2. Concentrated urine was prepared by 5x concentration using a membrane distillation setup (identical to the membrane contactor setup described below), with a urine temperature of 50° C. and a cold DI water temperature of 20° C. until 5× concentration was achieved.

were measured on an AutoAnalyzer AA3 (BranLuebbe, Germany) following the nitroprusside method. All anions were measured on an ion chromatograph Compact IC Flex 930 (Metrohm AG, Switzerland).

Results—Synthetic Urine

Figure 3:
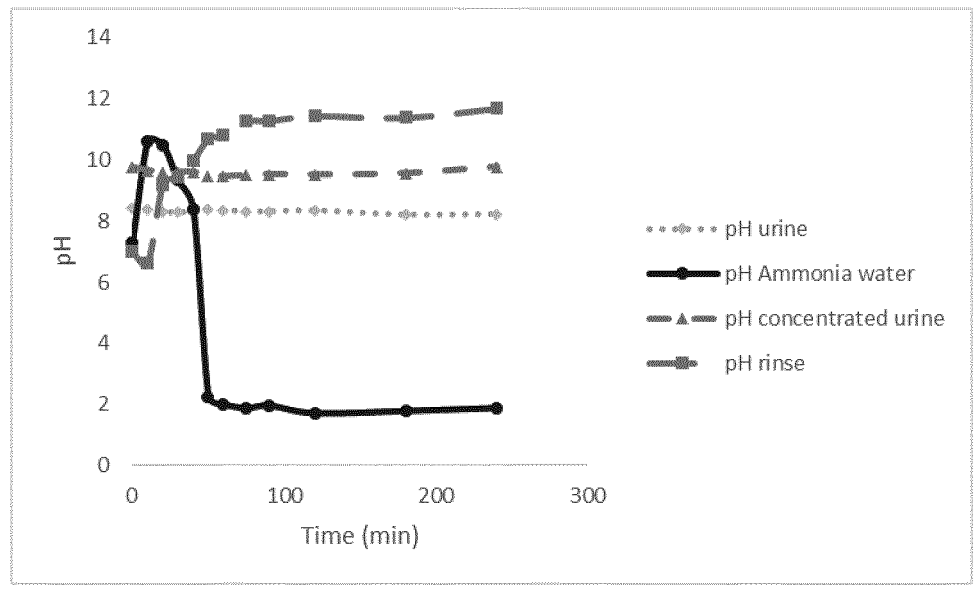
FIG. 3 illustrates the pH change during the tests on synthetic urine.

In FIG. 3, the pH change during the experiment with synthetic urine is shown. It can be seen that the system is capable of reducing the pH of the acid stream (ammonia

TABLE 2

Composition of the solutions used in the experiments with real urine

| Component | Urine | | Conc. Urine | | Ammonia water | | ESO | |
|---|---|---|---|---|---|---|---|---|
| $NH_4^+$ | 3498 | mg/L | 5582 | mg/L | 0 | mg/L | 0 | mg/L |
| $Na^+$ | 5791 | mg/L | 8834 | mg/L | 0 | mg/L | 11500 | mg/L |
| $K^+$ | 1660 | mg/L | 4168 | mg/L | 0 | mg/L | 0 | mg/L |
| $Ca^{2+}$ | 46 | mg/L | 8 | mg/L | 0 | mg/L | 0 | mg/L |
| $Mg^{2+}$ | 77 | mg/L | 38 | mg/L | 0 | mg/L | 0 | mg/L |
| $Cl^-$ | 3406 | mg/L | 9112 | mg/L | 0 | mg/L | 17725 | mg/L |
| $NO_3^-$ | 345 | mg/L | 88 | mg/L | 0 | mg/L | 0 | mg/L |
| $SO_4^{2-}$ | 1072 | mg/L | 10670 | mg/L | 0 | mg/L | 0 | mg/L |
| $PO_4^{3-}$ | 992 | mg/L | 956 | mg/L | 0 | mg/L | 0 | mg/L |
| TOC | 7 | mg/L | 4759 | mg/L | 0 | mg/L | 0 | mg/L |
| Initial pH | 9.4 | Initial pH | 9.7 | Initial pH | 7 | | | |

Membrane Contactor

The membrane used for the membrane contactor experiments was an Aquastill proprietary polyethylene membrane in a custom-built PMMA membrane module. The active water) to pH 2. However, due to the presence of the AEM between urine and concentrated urine stream and between concentrated and electrode rinse solution, OH– ions are being transported towards the anode side, increasing the pH of the rinse solution. As such, the pH of the urine stream could not be increased higher than pH 8.45. To alleviate this issue, the AEM membrane between urine and concentrated urine stream was changed to a MCEM membrane for the real urine testing. Alternatively, a CEM membrane could also be used, however, no AEM or MAEM membranes are preferably used, since they allow the passage of $OH^-$ ions. The advantage of an MCEM membrane over a CEM membrane is that most of the target cations are monovalent ions: $K^+$ and $NH_4^+$. A CEM would also allow passage of $Mg^{2+}$ and $Ca^{2+}$, which typically does not have any added value.

Figure 4:
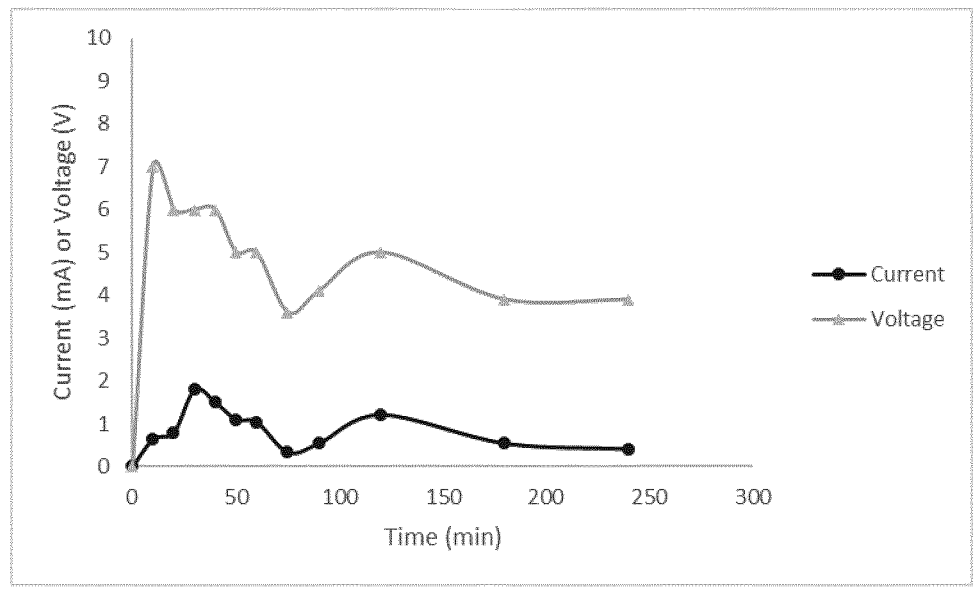
FIG. 4 illustrates the change of the applied current and voltage during the tests on synthetic urine.
Figure 5A:
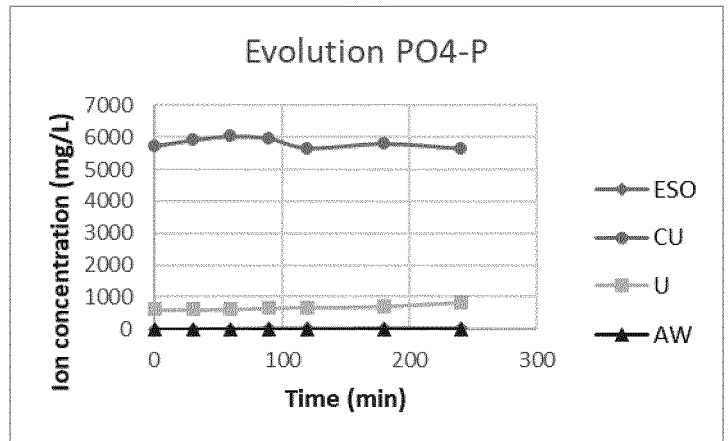
FIG. 5 illustrates the change in ionic composition of the various solutions used in the synthetic urine experiments.
Figure 5B:
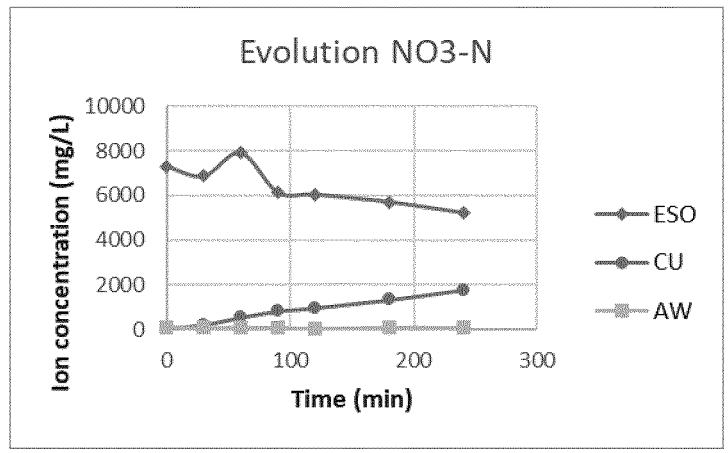
Figure 5C:
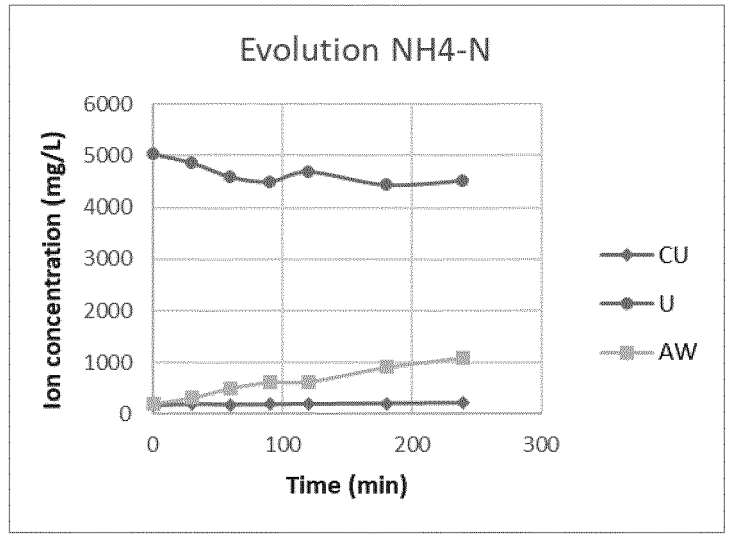
Figure 5D:
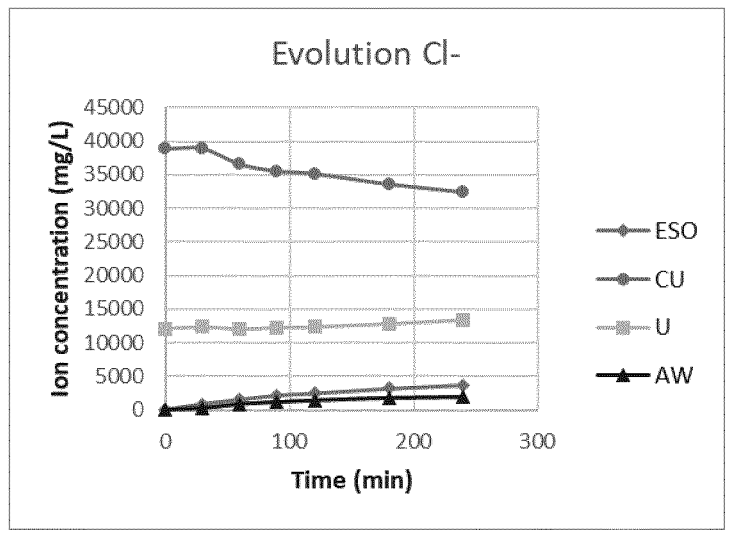
Figure 5E:
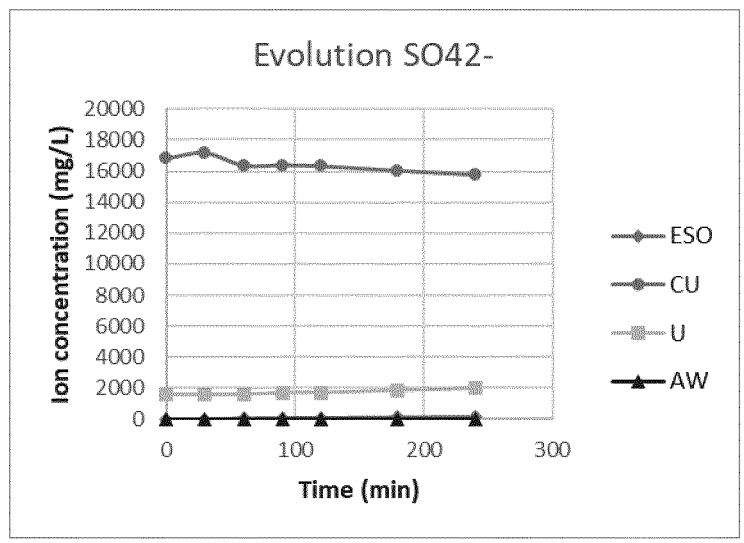

In FIG. 4, the applied voltage and current are shown during the experiments using synthetic urine. During an initial phase, the ammonia water is not sufficiently acidified by the bipolar membrane, and as such the voltage was increased. Due to the initial absence of ions in the ammonia water stream (and high resistance), the current is quite low. To this effect, tap water is preferred as initial solution.

In FIG. 5, the change in ionic composition during the synthetic urine experiments is shown. PO4-P and $SO_4^{2-}$ is transported only to a minor extent. Contrary to that, $NO_3^-$ (coming from the $NaNO_3$-based electrode rinse solution) and $Cl^-$ are transported to a larger extent. $NO_3^-$ is transported mainly from rinse solution to concentrated urine, while $Cl^-$ is transported away from concentrated urine to urine, ammonia water and rinse solution. By using NaCl as a rinse solution, this unnecessary loss of $NO_3^-$ could be prevented, as $Cl^-$ would be transported from the concentrated urine towards the rinse at the anode side, while the opposite would happen at the cathode side. $Cl^-$ transport towards the ammonia water side could allow the production of ammonium chloride, a salt with a higher market value than dilute ammonium solutions. Other than that, PO4-P is being transported (slowly) from concentrated urine to urine side. The same is true for $SO_4^{2-}$. Nevertheless, recovery of trace amounts of PO4-P from the otherwise wasted concentrated urine is an unexpected side-effect. NH4-N is transported from urine to ammonia water in the membrane contactor, as the bipolar membrane does not allow passage of ions, which is why NH4-N is increasing in ammonia water and reducing in urine. However, due to the fact that the urine pH cannot sufficiently be increased due to losses of $OH^-$ (see above), the ammonia recovery is incomplete. By installing an MCEM or CEM membrane, the passage of $OH^-$ ions is prevented.

Results—Real Urine

As the synthetic urine experiments showed that the pH of urine was not easily kept at 10 (target pH) with an AEM between urine and concentrated urine, this membrane was replaced by a monovalent cation exchange membrane. Other conditions were kept the same.

Figure 6:
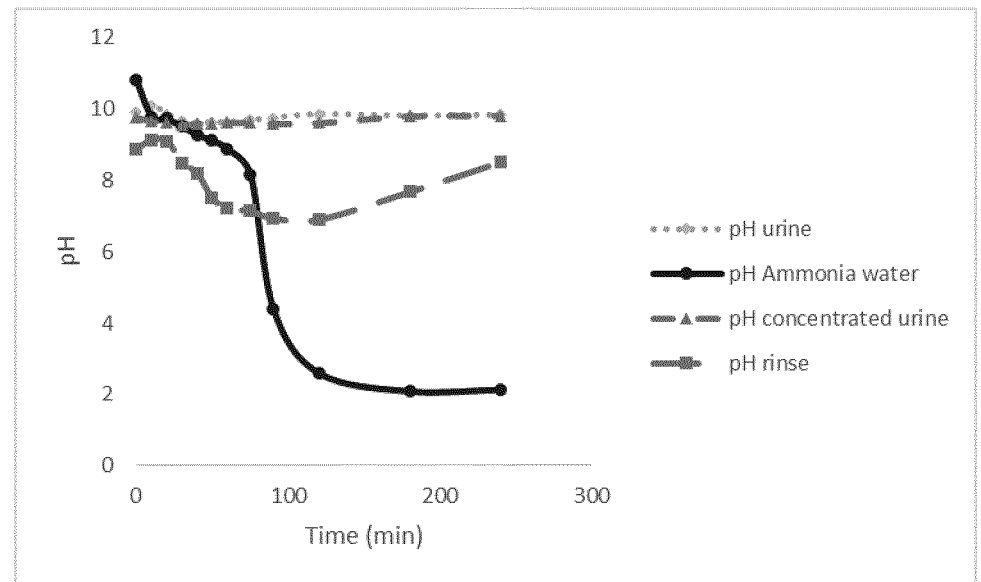
FIG. 6 illustrates the change of pH during the real urine experiments.

In FIG. 6, it can be seen that during the real urine experiments, the system is capable of reducing both the pH of the ammonia water as well as increasing the pH of the urine stream. The other streams (concentrated urine and the rinse solution) are kept more or less constant regarding pH. Regarding pH, this configuration of membranes is optimal.

Figure 7:
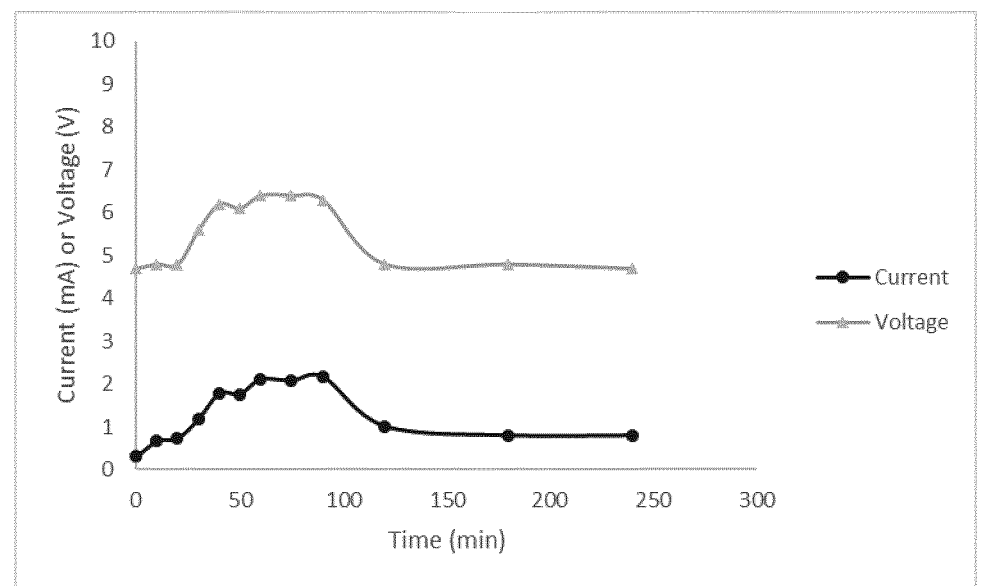
FIG. 7 illustrates the voltage and current applied during the real urine experiments.
Figure 8A:
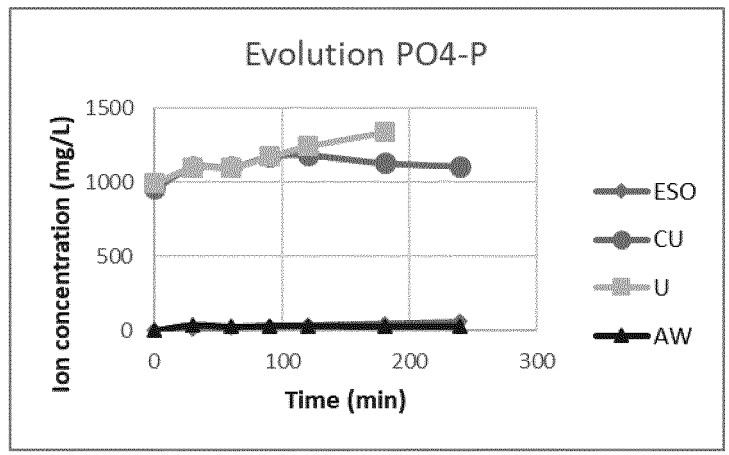
FIG. 8 illustrates the change in concentration of major ions in all streams tested during the real urine experiment.
Figure 8B:
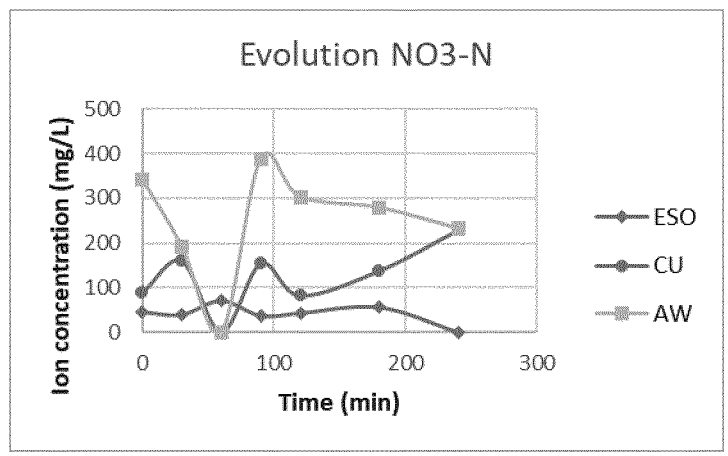
Figure 8C:
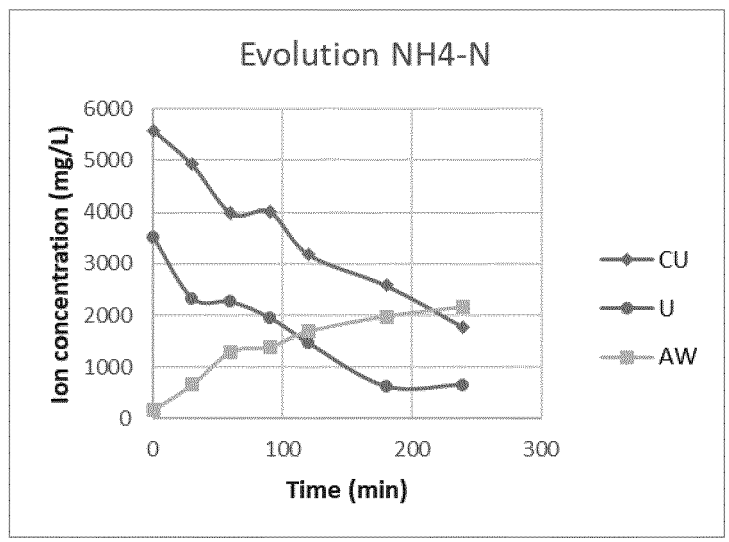
Figure 8D:
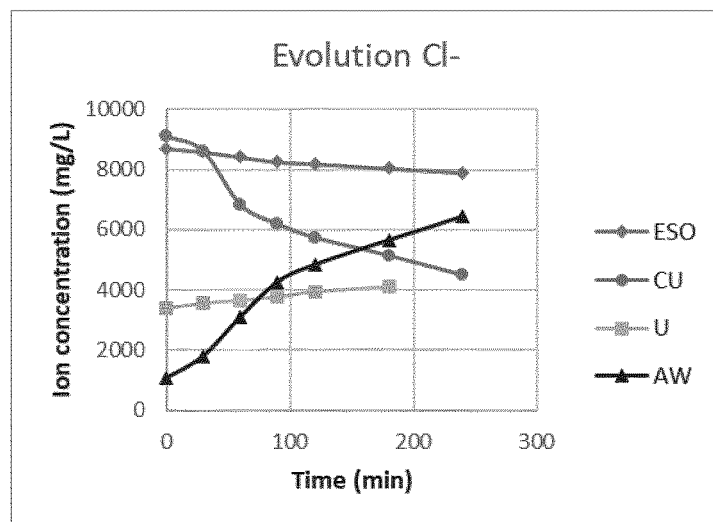
Figure 8E:
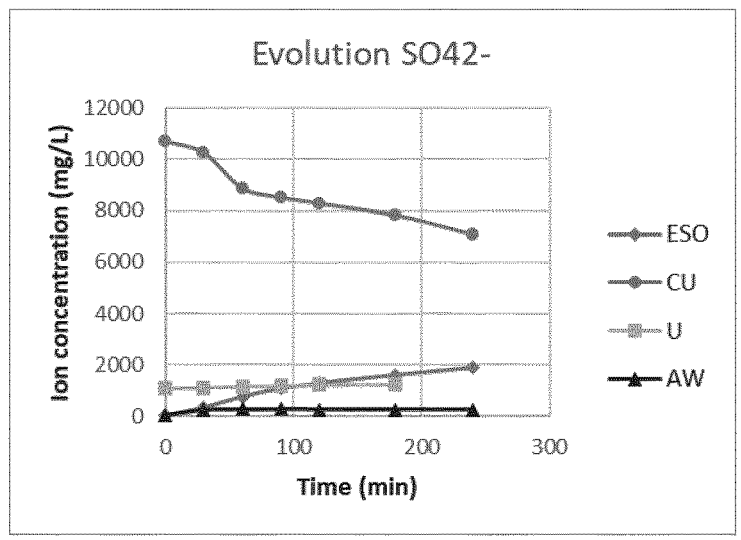
Figure 8F:
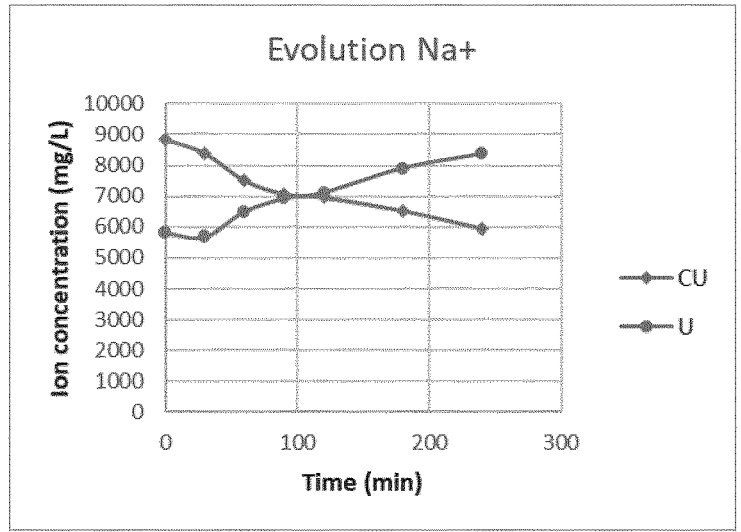
Figure 8G:
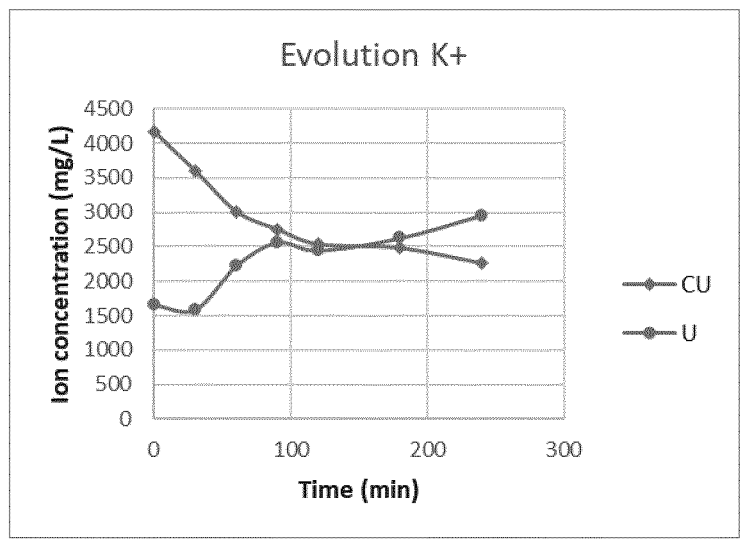

FIG. 7 shows the applied current and voltage during the real urine experiment. It can be seen that, while the membrane stack may require a 'kick' in voltage and current to get the system working as required, once the correct pH set points are reached, a low voltage of 4.5 V can be applied to the stack, requiring only +−5 W of electrical energy.

The change in concentration of all major ions present in the process is shown in FIG. 8. Similar to synthetic urine, in real urine phosphate and sulphate are not transported in large amounts. However, the effect of recovery of PO4-P from the concentrated urine (which is otherwise discarded) towards the urine stream is clear, as well as the transport of sulphate from concentrated urine to ammonia water, where it serves as a counter ion for the NH4-N that is transported in the membrane contactor. As some losses for NH4-N are encountered as well (as the solutions flasks were difficult to seal completely, as such ammonia is lost to the air), it is difficult to distinguish the exact transport processes. However, transport takes place between concentrated urine and urine (due to the presence of the MCEM membrane and the charge gradient) in the stack, while NH4-N is transported from urine to ammonia water side in the external membrane contactor. Similar to the synthetic urine experiment, $Cl^-$ ions are transported from concentrated urine to ammonia water, where they can serve as a counter ion for ammonium. Finally, due to the presence of the MCEM, Na and K are also transported from concentrated urine to urine.

Figure 9:
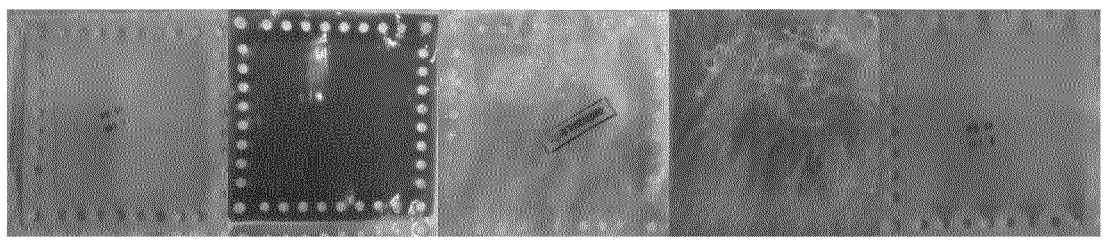
FIG. 9 illustrates the virgin membranes (anode to cathode) prior to all experiments
Figure 10:
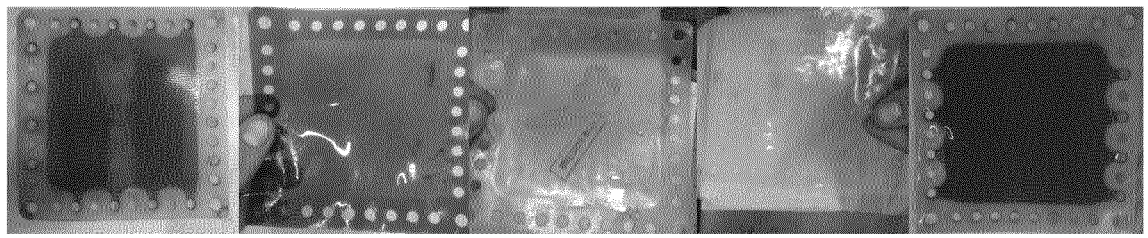
FIG. 10 illustrates the fouled membranes (only membranes, not spacers) after a first, initial run with real urine.
Figure 11:
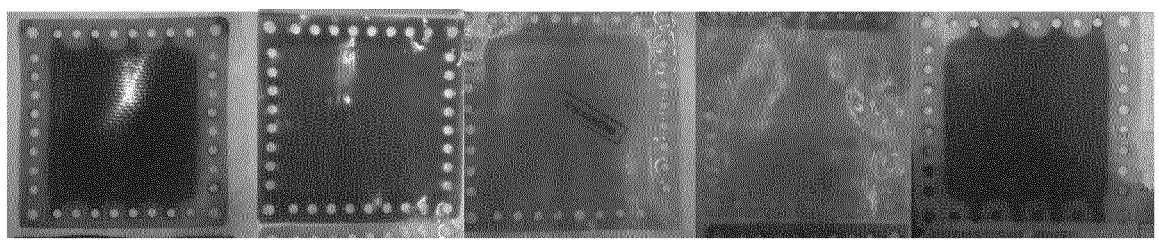
FIG. 11 illustrates the fouled membranes after a second, final run with real urine.

While the ion fluxes through the membranes predict only a limited effect of fouling, the membranes were investigated prior to operation as well as after operation. FIG. 9 shows the membranes prior to the experiment, while FIG. 10 and FIG. 11 show the membranes after testing with real urine. No differences were noted after the synthetic urine experiments.

The membranes reveal that fouling was not a major issue. While the conductive spacers did show some deformation due to the presence of small particles in the feed urine getting stuck in the spacer pores, the membranes themselves only showed very loose attachment of possible foulants— rinsing with demineralized water removed this fouling layer completely. Only the AEM membranes, which attract negatively charged hydrophobic compounds present in urine (such as bilirubin and biliverdin), and colour the membrane.

Example 2

Additional tests on pig manure were performed using a lab-scale system consisting of an electrodialysis with bipolar membrane stack and a membrane contactor.

Materials and Methods

Pig manure was collected from piglets and sows at a farm located in Nevele, Belgium. The manure was processed through the membrane stripping process from SATURN (see Example 1). The compositions of the pig manure samples may be found listed in Table 3 below.

TABLE 3

Composition of the solutions used in the experiments with pig manure.

| Component | Manure | Stripped manure | Ammonia water | ESO |
|---|---|---|---|---|
| $NH_4^+$ (mg/L) | 1453 | 55 | 0 | 0 |
| $Na^+$ (mg/L) | 509 | 5466 | 65 | 11500 |
| $K^+$ (mg/L) | 1535 | 1178 | 0 | 0 |
| $Ca^{2+}$ (mg/L) | 169 | N.D. | 0 | 0 |
| $Mg^{2+}$ (mg/L) | 62 | 105 | 0 | 0 |
| $Cl^-$ (mg/L) | 646 | 1643 | 100 | 17725 |
| $NO_3^-$ (mg/L) | 6 | 22 | 0 | 0 |
| $PO_4^{3-}$ (mg/L) | 56 | 81 | 0 | 0 |
| $SO_4^{2-}$ (mg/L) | 53 | 466 | 0 | 0 |

In the present experiment, two phases were applied during the experiment: in a first phase, the external membrane contactor was not connected to the EDBM system (purpose of this phase was adjusting the pH of manure and ammonia water stream); in a second phase, the external membrane contactor was coupled to the EDBM system.

Membrane Contactor

For the pig manure experiments, the same setup was used as in Example 1, with the exception that no additional concentration was achieved. As such, at the acid side of the membrane a 0.5 M $H_2SO_4$ solution was used which was not diluted; at the feed side of the membrane pig manure from an earlier batch was used.

Results

Figure 12:
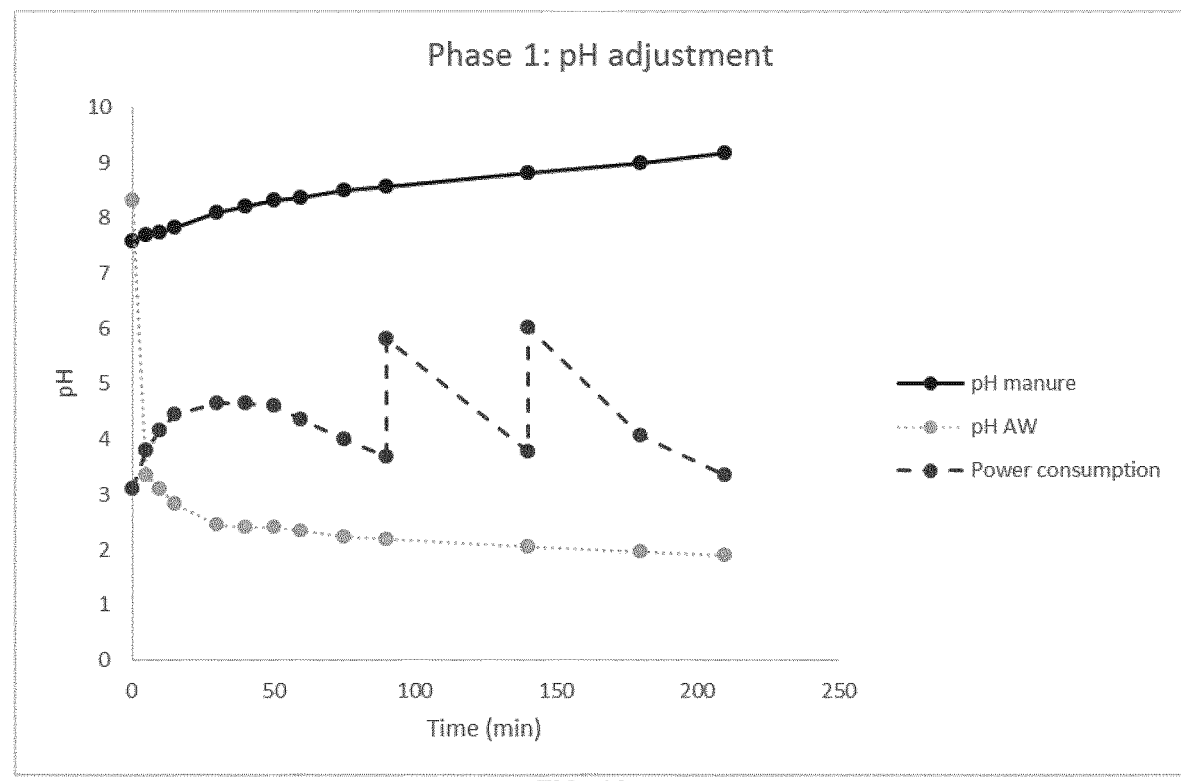
FIG. 12 illustrates the adjustment of the pH during Phase 1 of example 2.
Figure 13:
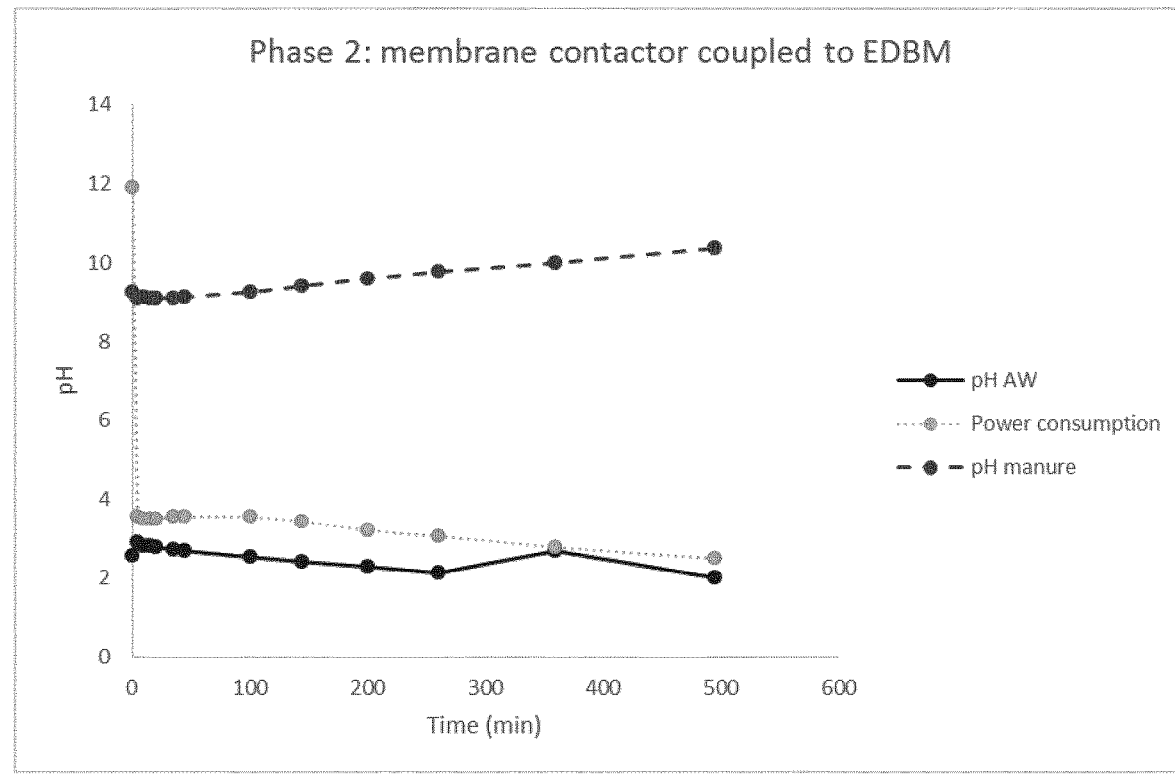
FIG. 13 illustrates the adjustment of the pH during Phase 2 of example 2.

As can be seen from the results presented in FIG. 12 (Phase 1) and FIG. 13 (Phase 2), the EDBM stack is capable of adjusting the pH to the desired level (>10 for the manure side; <3 for the acid side) by temporarily uncoupling the membrane contactor (Phase 1) as well as maintaining these pH levels during Phase 2, where the membrane contactor is connected downstream to the EDBM stack. This shows the capability of the EDBM system to completely replace the bulk acid and base dosage required to adjust the pH prior to the membrane stripping unit as well as maintaining the desired pH levels when the membrane stripping system is added downstream.

Figure 14A:
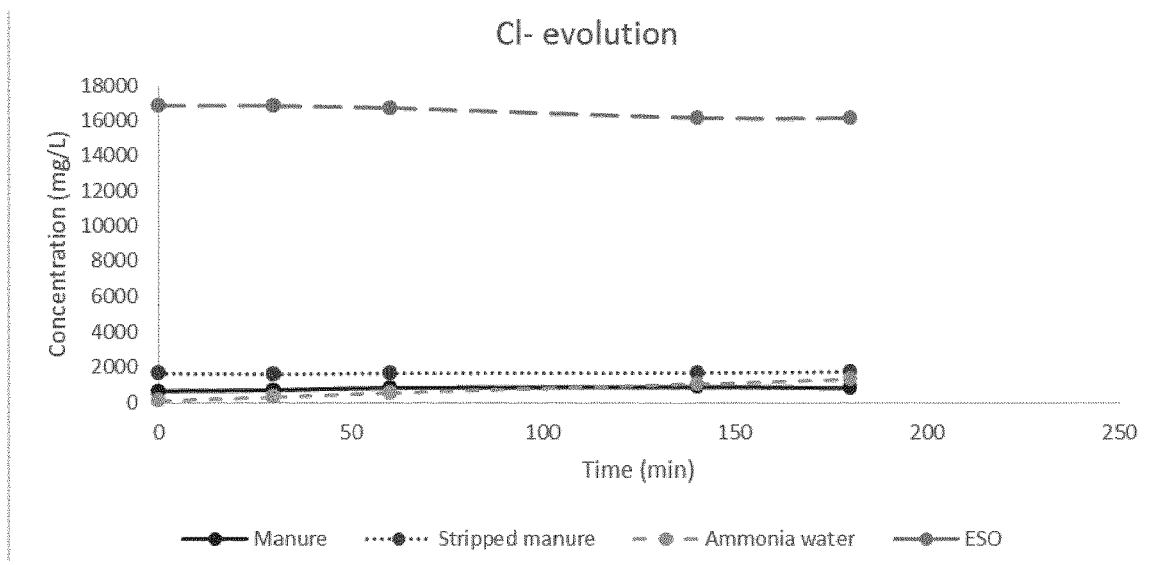
FIG. 14 (A to C) illustrates the movement of ions through the EDBM stack during Phase 1 of example 2.
Figure 14B:
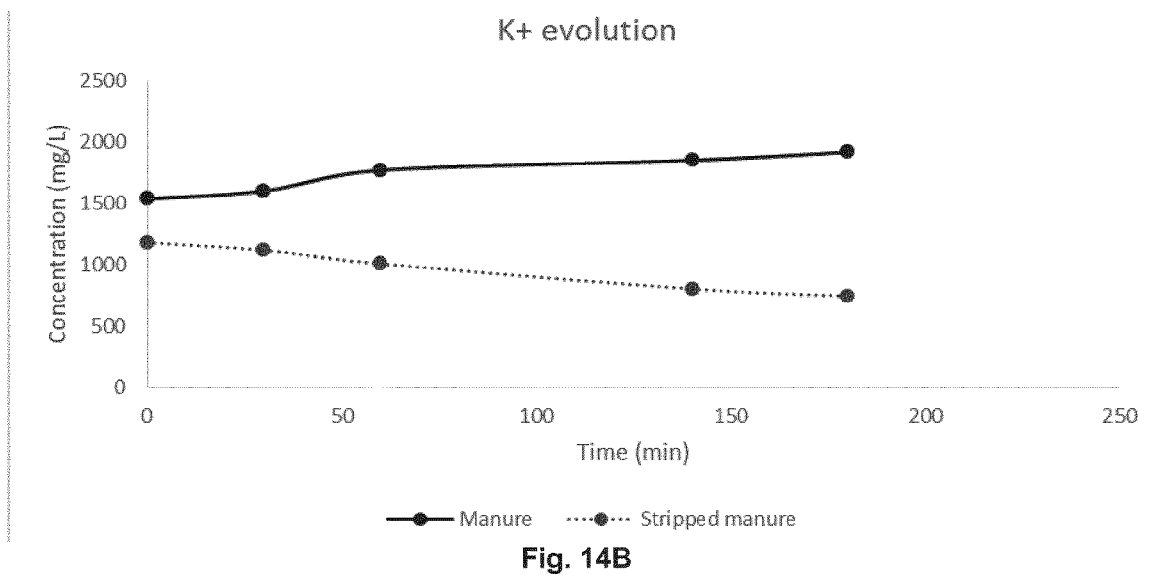
Figure 14C:
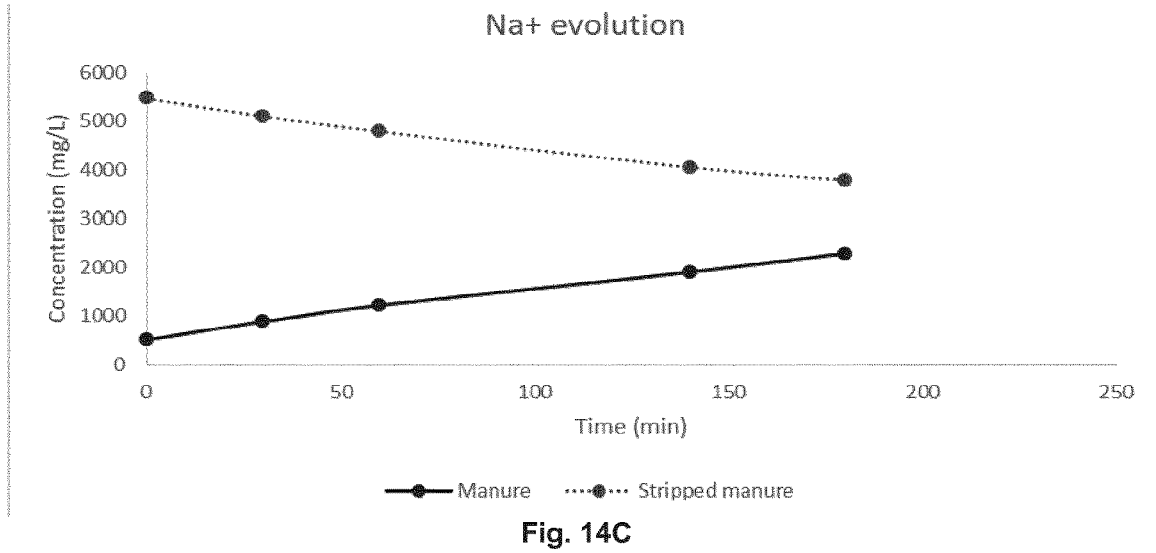
Figure 15A:
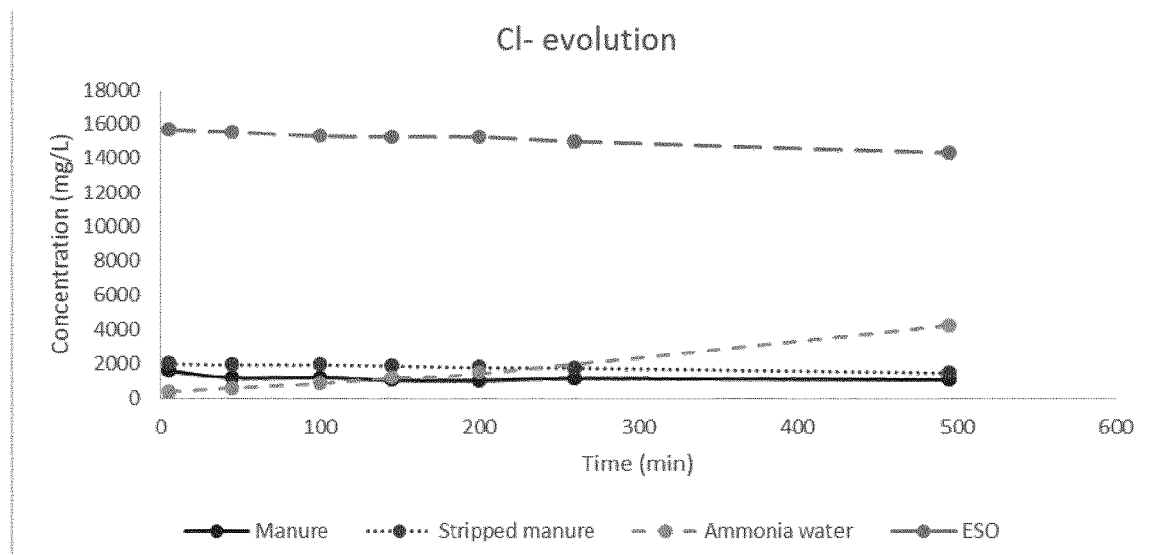
FIG. 15 (A to E) illustrates the movement of ions through the EDBM stack and external membrane contactor during Phase 2 of example 2.
Figure 15B:
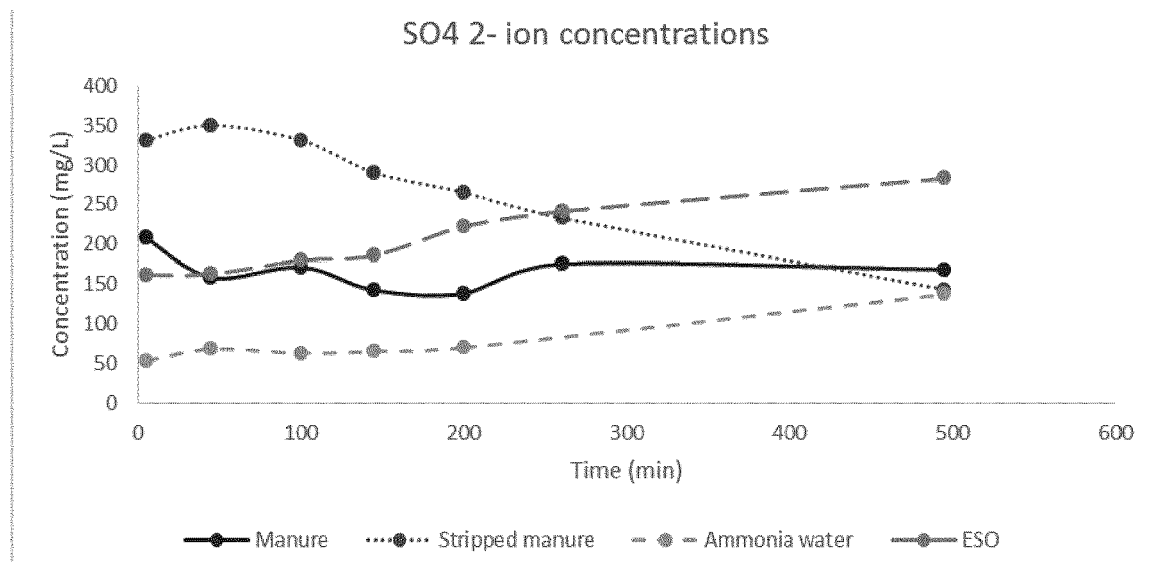
Figure 15C:
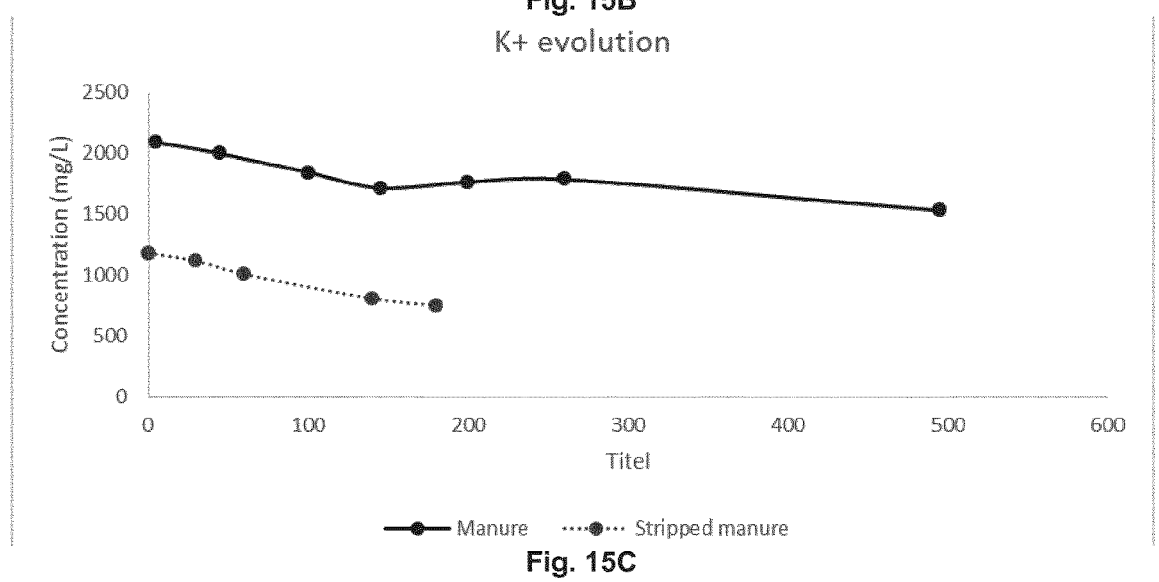
Figure 15D:
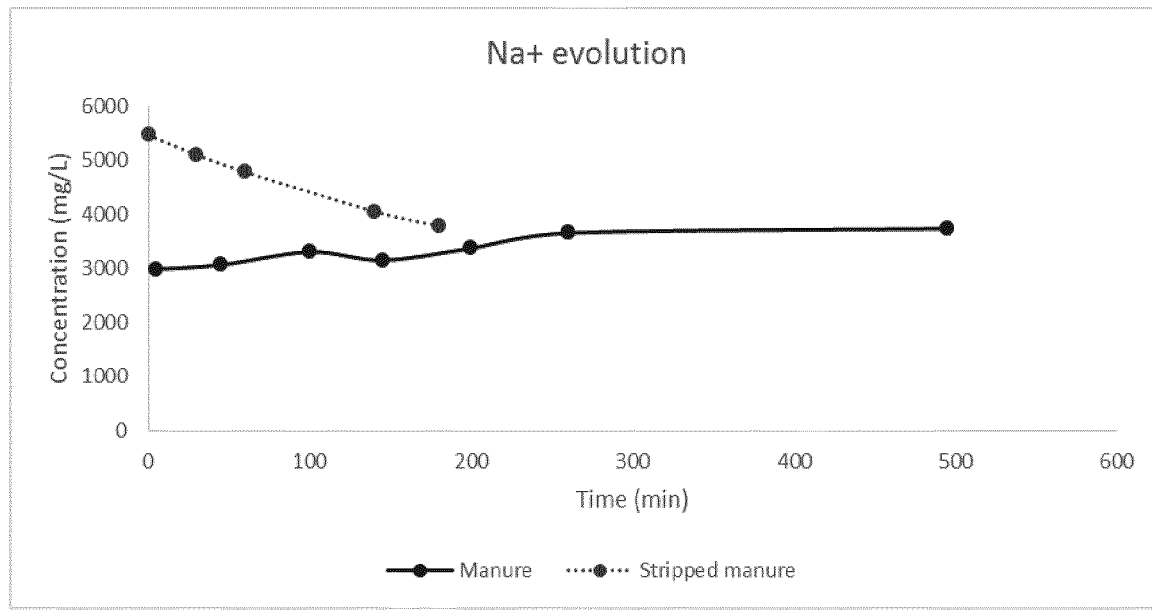
Figure 15E:
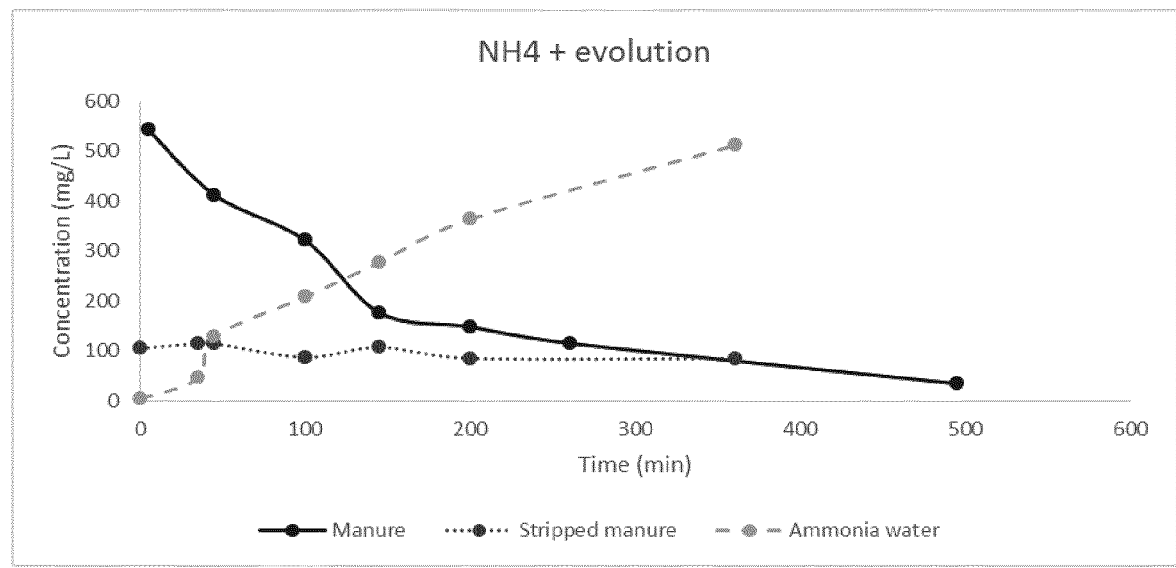

In FIG. 14 (A to C), the movement of ions through the EDBM stack is shown during Phase 1. During this phase, already some Cl⁻ is transported from the effluent (stripped manure) and electrode rinse solution (ESO) to the product stream (ammonia water), where it will serve as a counter-ion for $NH_4^+$ when the membrane stripping unit is coupled. Other than that, it can be seen that $Na^+$ and $K^+$ are also selectively transported to the manure side, which is beneficial for downstream recovery of K through K-struvite precipitation (as described in the SATURN process). Concurrently, the salinity of the stripped manure is reduced, and is therefore less liable to cause salinification in soils, should it be used as a soil improver.

In FIG. 15 (A to E), the movement of ions through the EDBM stack and external membrane contactor is shown during Phase 2 (coupling of EDBM with membrane stripper). As can be seen, the selective transport of Cl⁻ and $SO_4^{2-}$ from electrode rinse solution and stripped manure continues. As the ratio of Cl- to $SO_4^{2-}$ is >10, the product (ammonia water) can be deemed of high purity. During Phase 2, the selective transport of $Na^+$ and $K^+$ can be seen to reach an equilibrium value. Finally, $NH_4^+$ is transported as ammonia across the hydrophobic membrane of the membrane stripper at high mass flux, while pH levels in manure remain constant. The coupling of membrane stripper to EDBM stack therefore has high potential as a bulk-chemical free solution even for highly loaded organic matter streams such as manure.

The invention claimed is:

1. Method for the recovery of N from a liquid waste stream comprising an N-comprising compound, said method comprising passing said waste stream through a multi-compartment electrodialysis bipolar membrane (EDBM) system;
    wherein said EDBM system comprises an anode electrode, a cathode electrode, a bipolar membrane, at least one monovalent cation exchange membrane, at least one monovalent anion exchange membrane, and at least four flow channels comprising a first flow channel, provided at the anode side of the EDBM system and bound by a monovalent cation exchange membrane, a second flow channel, bound by the monovalent cation exchange membrane and the OH– producing side of a bipolar membrane, a third flow channel, bound by the H+ producing side of a bipolar membrane and a monovalent anion exchange membrane, and a fourth flow channel, provided at the cathode side of the EDBM system and bound by the monovalent anion exchange membrane;
    said method comprising the steps of:
    (a) increasing the pH of the liquid waste stream and transferring monovalent cations by contacting said liquid waste stream simultaneously with the OH– producing side of the bipolar membrane and with a monovalent cation exchange membrane of the multi-compartment EDBM system to produce a pH adjusted liquid waste stream;
    (b) removing the N-comprising compound from the pH adjusted liquid waste stream, thereby obtaining a N-poor waste stream;
    (c) separating at least part of the N-poor waste stream into a first part and a second part; and,
    (d) returning or recycling at least part of the N-poor waste stream to the multi-compartment EDBM system, while
        (i) removing the monovalent ions transferred in step (a) from the first part of the N-poor waste stream by contacting said N-poor waste stream with a monovalent ion extraction means; and,
        (ii) removing monovalent anions from the second part of the N-poor waste stream by contacting said N-poor waste stream with a monovalent anion exchange membrane.

2. The method according to claim 1, further comprising after step (b) concentrating the N-poor waste stream through water removal, to obtain a concentrated N-poor waste stream.

3. The method according to claim 2, further comprising the step of recovering P and K from said N-poor waste stream through crystallization, thus obtaining an N—P—K-poor waste stream, wherein the step of recovering P and K is performed by addition of $MgCl_2$ and subsequent recovery of K-struvite crystals, and wherein in step (d) at least part of the N—P—K-poor waste stream is returned to the multi-compartment EDBM system.

4. The method according to claim 1, wherein in step (b) the pH adjusted liquid waste stream is contacted with an acidified receiving solution via a membrane for transferring the N-comprising compound to the acidified receiving solution.

5. The method according to claim 4, wherein the acidified receiving solution comprises a water stream, which is recirculated at the H+ producing side of the bipolar membrane and which simultaneously captures the monovalent anions removed in step (d) from the N-poor waste stream.

6. The method according to claim 5, wherein the water stream comprises water recovered from the pH adjusted liquid waste stream-in step (b).

7. The method according to claim 4, wherein the N-comprising compound removed in step (b) is ammonia, which is recovered in the acidified receiving solution as $NH_4Cl$.

8. The method according to claim 1 further comprising the step of rinsing the electrodes with a rinsing solution, which is recirculated between the anode and the cathode.

9. The method according to claim 8, wherein the rinsing solution comprises NaCl.

10. The method according to claim 1, wherein the liquid waste stream is filtered prior to step (a).

11. The method according to claim 1, wherein the multi-compartment EDBM system comprises two rinse channels, each bound by an electrode and an anion exchange membrane and provided adjacent to the first and fourth flow channel, wherein the first channel is bound by an anion exchange membrane and the monovalent cation exchange membrane, and wherein the fourth channel is bound by an anion exchange membrane and the monovalent anion exchange membrane.

12. A system for the recovery of N, and one or both of P and K, from a liquid waste stream said system comprising:
a multi-compartment electrodialysis bipolar membrane (EDBM) system, comprising an anode and cathode electrode, a first flow channel, provided at the anode side of the EDBM system and bound by a monovalent cation exchange membrane, a second flow channel, bound by the monovalent cation exchange membrane and the OH− producing side of a bipolar membrane, having an inlet for providing the liquid waste stream to the second flow channel; a third flow channel, bound by the H+ producing side of a bipolar membrane and a monovalent anion exchange membrane, and a fourth flow channel, provided at the cathode side of the EDBM system and bound by the monovalent anion exchange membrane, and two rinse channels, each bound by an electrode and an anion exchange membrane and provided adjacent to the first and fourth flow channel wherein the first channel is bound by an anion exchange membrane and the monovalent cation exchange membrane, and wherein the fourth channel is bound by an anion exchange membrane and the monovalent anion exchange membrane; and
a unit for the recovery of N, wherein an inlet of said unit is connected to an outlet of the second flow channel and to an outlet of the third flow channel.

13. The system according to claim 12, wherein the unit for the recovery of N is a membrane contactor unit having a first and a second compartment, wherein an inlet of the first compartment is connected with the outlet of the second flow channel and wherein an outlet of the first compartment is connected to the concentrator, wherein an inlet of the second compartment is connected with an outlet of the third channel of the EDBM system.

14. The system according to claim 12, further comprising a concentrator, wherein an inlet of said concentrator is connected to an outlet of the unit for the recovery of N and wherein an outlet of said concentrator is connected to an inlet of the first and the fourth flow channel.

15. The system according to claim 14, further comprising a crystallizer unit, wherein the inlet of the crystallizer unit is connected to the outlet of the concentrator and the outlet of the crystallizer unit is connected to the first and fourth flow channel.

16. Use of the system according to claim 12 for the recovery of N, and one or both of P and K, from a liquid waste stream.

17. The system according to claim 12, wherein the liquid waste stream comprises one or more of urine, excreta and wastewater.

18. The method according to claim 1, wherein the liquid waste stream comprises one or more of urine, excreta and wastewater.

19. The method according to claim 1, wherein in step (d) (ii) the monovalent anions that are removed comprise $Cl^-$.

* * * * *